(12) United States Patent
Nakagami et al.

(10) Patent No.: US 8,705,627 B2
(45) Date of Patent: Apr. 22, 2014

(54) IMAGE PROCESSING APPARATUS AND METHOD

(75) Inventors: Ohji Nakagami, Tokyo (JP); Junichi Tanaka, Kanagawa (JP); Takefumi Nagumo, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 13/054,648

(22) PCT Filed: Jul. 24, 2009

(86) PCT No.: PCT/JP2009/063249
§ 371 (c)(1),
(2), (4) Date: Jan. 18, 2011

(87) PCT Pub. No.: WO2010/010942
PCT Pub. Date: Jan. 28, 2010

(65) Prior Publication Data
US 2011/0122953 A1 May 26, 2011

(30) Foreign Application Priority Data
Jul. 25, 2008 (JP) ................. 2008-192093

(51) Int. Cl.
*H04N 7/12* (2006.01)
*H04N 11/02* (2006.01)
*H04N 11/04* (2006.01)
*H04N 7/26* (2006.01)
*H04N 7/36* (2006.01)
*H04N 7/50* (2006.01)

(52) U.S. Cl.
CPC .......... *H04N 7/26* (2013.01); *H04N 19/00036* (2013.01); *H04N 19/00715* (2013.01); *H04N 19/00787* (2013.01)
USPC .................................. 375/240.16

(58) Field of Classification Search
USPC ................................... 375/240.16
See application file for complete search history.

(56) References Cited

U.S. PATENT DOCUMENTS 4,551,753 A * 11/1985 Nishizawa et al. ........... 348/446
4,651,211 A * 3/1987 Weckenbrock et al. ...... 348/702

(Continued)

FOREIGN PATENT DOCUMENTS

JP      8 154250      6/1996
WO    2006 112272    10/2006

OTHER PUBLICATIONS

Wan et. al., Perceptually Adaptive Joint Deringing—Deblocking Filtering for Scalable Video Coding, 2006, pp. 5.*

(Continued)

*Primary Examiner* — Sath V Perungavoor
*Assistant Examiner* — Peter D Le
(74) *Attorney, Agent, or Firm* — Oblon, Spivak, McClelland, Maier & Neustadt, L.L.P.

(57) ABSTRACT

The present invention relates to an image processing apparatus and method that allow the generation of a high-accuracy prediction image without increasing the processing load.
A difference image between motion compensation images MC0 and MC1 extracted from different reference frames is calculated. A low-pass filter is applied to the difference image, and the gain of an obtained image is adjusted. A high-pass filter is applied to an image obtained by the application of a low-pass filter, and the gain of an obtained image is adjusted. An image obtained by adding the output of a gain adjustment circuit 53 and the output of a gain adjustment circuit 55 is added with the motion compensation image MC0, and a prediction image is generated. The present invention can be applied to an apparatus that performs prediction encoding, and an apparatus that decodes information encoded through prediction encoding.

20 Claims, 27 Drawing Sheets

(56) References Cited

U.S. PATENT DOCUMENTS

| | | | |
|---|---|---|---|
| 4,672,445 A * | 6/1987 | Casey et al. | 348/450 |
| 5,418,570 A * | 5/1995 | Ueno et al. | 375/240.14 |
| 5,719,627 A * | 2/1998 | Ohta | 348/398.1 |
| 5,777,678 A * | 7/1998 | Ogata et al. | 375/240.11 |
| 6,633,676 B1 | 10/2003 | Kleihorst et al. | |
| 7,545,988 B2 * | 6/2009 | Meeker | 382/232 |
| 2004/0081239 A1 * | 4/2004 | Patti et al. | 375/240.16 |
| 2004/0223548 A1 * | 11/2004 | Kato et al. | 375/240.16 |
| 2004/0233991 A1 * | 11/2004 | Sugimoto et al. | 375/240.16 |
| 2006/0002474 A1 * | 1/2006 | Au et al. | 375/240.16 |
| 2006/0008038 A1 * | 1/2006 | Song et al. | 375/350 |
| 2006/0051068 A1 * | 3/2006 | Gomila | 386/114 |
| 2006/0083308 A1 * | 4/2006 | Schwarz et al. | 375/240.16 |
| 2006/0133505 A1 * | 6/2006 | Watanabe et al. | 375/240.16 |
| 2006/0165298 A1 * | 7/2006 | Kikuchi | 382/232 |
| 2007/0053443 A1 * | 3/2007 | Song | 375/240.24 |
| 2007/0065026 A1 * | 3/2007 | Lee et al. | 382/236 |
| 2007/0098068 A1 * | 5/2007 | Kimata et al. | 375/240.12 |
| 2007/0116125 A1 * | 5/2007 | Wada et al. | 375/240.16 |
| 2007/0133891 A1 * | 6/2007 | Jeong | 382/238 |
| 2007/0183072 A1 | 8/2007 | Lee | |
| 2007/0291847 A1 * | 12/2007 | Shimauchi et al. | 375/240.16 |
| 2008/0008252 A1 * | 1/2008 | Xu et al. | 375/240.29 |
| 2008/0037642 A1 * | 2/2008 | Tsuchiya et al. | 375/240.16 |
| 2008/0123740 A1 * | 5/2008 | Ye | 375/240.11 |
| 2008/0260043 A1 * | 10/2008 | Bottreau et al. | 375/240.26 |
| 2008/0310506 A1 * | 12/2008 | Xu et al. | 375/240.12 |
| 2009/0010568 A1 | 1/2009 | Nakagami et al. | |
| 2009/0067501 A1 * | 3/2009 | Boon et al. | 375/240.16 |
| 2009/0074061 A1 | 3/2009 | Yin et al. | |
| 2009/0080535 A1 * | 3/2009 | Yin et al. | 375/240.26 |
| 2009/0112272 A1 | 4/2009 | Schleicher et al. | |
| 2009/0116760 A1 * | 5/2009 | Boon et al. | 382/238 |
| 2009/0225843 A1 * | 9/2009 | Lee et al. | 375/240.13 |
| 2009/0262803 A1 * | 10/2009 | Wang et al. | 375/240.12 |
| 2009/0290637 A1 * | 11/2009 | Lai et al. | 375/240.02 |
| 2010/0002767 A1 * | 1/2010 | Fujibayashi et al. | 375/240.12 |
| 2010/0067574 A1 * | 3/2010 | Knicker et al. | 375/240.12 |
| 2010/0098165 A1 * | 4/2010 | Farfade et al. | 375/240.16 |
| 2010/0118963 A1 | 5/2010 | Nakagami et al. | |
| 2010/0183072 A1 * | 7/2010 | Nakagami et al. | 375/240.16 |
| 2010/0239015 A1 * | 9/2010 | Wang et al. | 375/240.16 |
| 2012/0288002 A1 * | 11/2012 | Shin et al. | 375/240.16 |

OTHER PUBLICATIONS

U.S. Appl. No. 13/147,291, filed Aug. 1, 2011, Nakagami, et al.
U.S. Appl. No. 13/201,351, filed Aug. 12, 2011, Nakagami, et al.
U.S. Appl. No. 13/147,981, filed Aug. 4, 2011, Nakagami, et al.
International Search Report issued Oct. 20, 2009 in PCT/JP09/63249 filed Jul. 24, 2009.
Irani, Michal et al., "Improving Resolution by Image Registration", Graphical Models and Image Processing, vol. 53, No. 3, pp. 231-239, (1991).

* cited by examiner

IMAGE PROCESSING APPARATUS AND METHOD

TECHNICAL FIELD

The present invention relates to an image processing apparatus and method, and more specifically to an image processing apparatus and method that allow the generation of a high-accuracy prediction image without increasing the processing load.

BACKGROUND ART

Conventionally, encoding schemes using motion compensation such as MPEG (Moving Picture Experts Group) or H.26x and orthogonal transforms such as the discrete cosine transform, Karhunen-Loève transform, or wavelet transform have been generally utilized as encoding schemes in the case of handling moving images. In these moving image encoding schemes, the reduction in amount of code is achieved by utilizing the correlation in the space direction and time direction among the characteristics of an input image signal to be subjected to encoding.

For example, in H.264, unidirectional prediction or bidirectional prediction is used when an inter-frame that is a frame to be subjected to inter-frame prediction (inter-prediction) is generated by utilizing the correlation in the time direction. Inter-frame prediction is designed to generate a prediction image on the basis of frames at different time points.

FIG. 1 is a diagram illustrating an example of unidirectional prediction.

As illustrated in FIG. 1, in a case where a frame to be encoded $P_0$ that is a frame at the current time point, which is to be subjected to encoding, is generated by unidirectional prediction, motion compensation is performed using, as reference frames, already encoded frame at past or future time points in time with respect to the current time point. The residual error between a prediction image and an actual image is encoded by utilizing the correlation in the time direction, thus making it possible to reduce the amount of code. Reference frame information and a motion vector are used, respectively, as information specifying a reference frame and information specifying a position to be referred to in the reference frame, and these pieces of information are transmitted from the encoding side to the decoding side.

Here, the number of reference frames is not limited to one. For example, in H.264, it is possible to use a plurality of frames as reference frames. As illustrated in FIG. 1, in a case where two frames closer in time to the frame to be encoded $P_0$ are denoted by reference frames $R_0$ and $R_1$ in this order, the pixel value of an arbitrary macroblock in the frame to be encoded $P_0$ can be predicted from the pixel value of an arbitrary pixel in the reference frame $R_0$ or $R_1$.

In FIG. 1, a box indicated inside each frame represents a macroblock. If a macroblock in the frame to be encoded $P_0$, which is to be predicted, is represented by a macroblock $MB_{P0}$, then, the macroblock in the reference frame $R_0$ corresponding to the macroblock $MB_{P0}$ is a macroblock $MB_{R0}$ that is specified by a motion vector $MV_0$. Furthermore, the macroblock in the reference frame $R_1$ is a macroblock $MB_{R1}$ that is specified by a motion vector $MV_1$.

If the pixel values of the macroblocks $MB_{R0}$ and $MB_{R1}$ (pixel values of motion compensation images) are represented by $MC_0(i, j)$ and $MC_1(i, j)$, then, one of the pixel values of the motion compensation images is used as the pixel value of a prediction image in unidirectional prediction. Thus, a prediction image Pred(i, j) is represented by Equation (1) below. (i, j) represents the relative position of a pixel in a macroblock, and satisfies 0≤i≤16 and 0≤j≤16. In Equation (1), "∥" indicates that one of the values $MC_0(i, j)$ and $MC_1(i, j)$ is taken.

[Math. 1]
$$\mathrm{Pred}(i,j) = MC_0(i,j) \| MC_1(i,j) \quad (1)$$

Note that it is also possible to divide a single macroblock of 16×16 pixels into sub-blocks sized by 16×8 pixels or the like and to perform motion compensation on each of the sub-blocks by referring to a different reference frame. Instead of motion vectors with integer accuracy, motion vectors with decimal accuracy are transmitted and interpolation is performed using an FIR filter defined in a standard, thus making it possible to also use the pixel values of pixels around the corresponding position to be referred to for motion compensation.

FIG. 2 is a diagram illustrating an example of bidirectional prediction.

As illustrated in FIG. 2, in a case where a frame to be encoded $B_0$ that is a frame at the current time point, which is to be subjected to encoding, is generated by bidirectional prediction, motion compensation is performed using already encoded frames at past and future time points in time with respect to the current time point, as reference frames. The residual error between a prediction image and an actual image is encoded by using, as reference frames, a plurality of already encoded frames and by utilizing the correlation therewith, thus making it possible to reduce the amount of code. In H.264, it is also possible to use a plurality of past frames and a plurality of future frames as reference frames.

As illustrated in FIG. 2, in a case where a past frame and a future frame with respect to the frame to be encoded $B_0$ are used as reference frames $L_0$ and $L_1$, the pixel value of an arbitrary macroblock in the frame to be encoded $B_0$ can be predicted from the pixel values of arbitrary pixels in the reference frames $L_0$ and $L_1$.

In the example of FIG. 2, the macroblock in the reference frame $L_0$ corresponding to a macroblock $MB_{B0}$ in the frame to be encoded $B_0$ is set as a macroblock $MB_{L0}$ that is specified by a motion vector $MV_0$. Furthermore, the macroblock in the reference frame $L_1$ corresponding to the macroblock $MB_{B0}$ in the frame to be encoded $B_0$ is set as a macroblock $MB_{L1}$ that is specified by a motion vector $MV_1$.

If the pixel values of the macroblocks $MB_{L0}$ and $MB_{L1}$ are represented by $MC_0(i, j)$ and $MC_1(i, j)$, respectively, then, the pixel value Pred(i, j) of a prediction image Pred(i, j) can be determined as the average value of these pixel values, as given in Equation (2) as follows.

[Math. 2]
$$\mathrm{Pred}(i,j) = (MC_0(i,j) + MC_1(i,j))/2 \quad (2)$$

In such motion compensation as above using unidirectional prediction, the accuracy of a prediction image is improved by increasing the accuracy of a motion vector or by reducing the size of a macroblock, and the residual error from the actual image is reduced, whereby the improvement in encoding efficiency is achieved.

Furthermore, in motion compensation using bidirectional prediction, the average of the pixel values of pixels of reference frames located close in time is used as the pixel value of a pixel of a prediction image, thus making feasible probabilistically stable reduction in prediction residual error.

CITATION LIST

Patent Literature

NPL 1: "Improving Resolution by Image Registration", MICHAL IRANI AND SHMUEL PELEG, Department of

SUMMARY OF INVENTION

Technical Problem

In the case of conventional unidirectional prediction, even when a plurality of reference frames are selectable, it is necessary to selectively use the pixel value of any one of the reference frames as the pixel value of a frame to be encoded. Therefore, an unselected reference frame is not used for motion compensation. Thus, the time correlation between a reference frame and a frame to be encoded may not be sufficiently utilized, and there may be room for improvement in terms of improved encoding efficiency.

Furthermore, in the case of conventional bidirectional prediction, the average value of the pixel values of two reference frames is used as the pixel value of a frame to be encoded. Thus, a temporal low-pass filter processing is performed, and high-frequency components are lost from a prediction image. As a result, since a residual error signal such as that including high-frequency components cannot be encoded, an image obtained through decoding is that from which high-frequency components are lost, resulting in degradation in resolution.

The present invention has been made in view of such a situation, and is intended to allow the generation of a high-accuracy prediction image without increasing the processing load.

Solution to Problem

An image processing apparatus according to an aspect of the present invention includes motion compensation means for performing motion compensation using, as reference frames, a plurality of frames formed of images obtained by decoding encoded images and using motion vectors included in the encoded images, and for generating a plurality of motion compensation images corresponding to a prediction image from different reference frames; first filtering means for applying a low-pass filter to a difference image between the plurality of motion compensation images generated by the motion compensation means; second filtering means for applying a high-pass filter to an image obtained by the first filtering means by the application of a low-pass filter; and prediction image generating means for generating the prediction image by adding the image obtained by the first filtering means by the application of a low-pass filter and an image obtained by the second filtering means by the application of a high-pass filter to one of the plurality of motion compensation images generated by the motion compensation means.

The image processing apparatus can further include decoding means for decoding the encoded images using a prediction image generated by the prediction image generating means.

The motion compensation means can select, as the reference frames, a frame one frame previous to the prediction image and a frame two frames previous to the prediction image.

The prediction image generating means can add the image obtained by the first filtering means by the application of a low-pass filter and the image obtained by the second filtering means by the application of a high-pass filter to a motion compensation image extracted from the frame one frame previous to the prediction image.

The image total processing apparatus can further include unidirectional prediction means for performing unidirectional prediction using a plurality of motion compensation images, and for generating the prediction image; and bidirectional prediction means for performing bidirectional prediction using a plurality of motion compensation images, and for generating the prediction image, and the prediction image generating means can refer to an identification flag included in an encoded image to select generation of the prediction image through unidirectional prediction by the unidirectional prediction means, generation of the prediction image through bidirectional prediction by the bidirectional prediction means, or generation of the prediction image by applying a low-pass filter to a difference image between a plurality of motion compensation images, by applying a high-pass filter to an image obtained by applying a low-pass filter, and by adding the image obtained by applying a low-pass filter and an image obtained by applying a high-pass filter to one of the plurality of motion compensation images.

An image processing method according to the aspect of the present invention includes a motion compensating step of performing motion compensation using, as reference frames, a plurality of frames formed of images obtained by decoding encoded images and using motion vectors included in the encoded images, and generating a plurality of motion compensation images corresponding to a prediction image from different reference frames; a first filtering step of applying a low-pass filter to a difference image between the plurality of motion compensation images generated in the motion compensating step; a second filtering step of applying a high-pass filter to an image obtained in the first filtering step by the application of a low-pass filter; and a prediction image generating step of generating the prediction image by adding the image obtained in the first filtering step by the application of a low-pass filter and an image obtained in the second filtering step by the application of a high-pass filter to one of the plurality of motion compensation images generated in the motion compensating step.

An image processing apparatus according to another aspect of the present invention includes detecting means for detecting a motion vector on the basis of an image, which is obtained through local decoding on the basis of a residual image indicating a difference between an original image to be subjected to encoding and a prediction image, and on the basis of the original image; motion compensation means for performing motion compensation using, as reference frames, a plurality of frames formed of images obtained through local decoding and using a motion vector detected by the detecting means, and for extracting a plurality of motion compensation images corresponding to the prediction image from different reference frames; first filtering means for applying a low-pass filter to a difference image between the plurality of motion compensation images extracted by the motion compensation means; second filtering means for applying a high-pass filter to an image obtained by the first filtering means by the application of a low-pass filter; and prediction image generating means for generating the prediction image by adding the image obtained by the first filtering means by the application of a low-pass filter and an image obtained by the second filtering means by the application of a high-pass filter to one of the plurality of motion compensation images extracted by the motion compensation means.

The image processing apparatus can further include encoding means for encoding the original image using the prediction image generated by the prediction image generating means.

The image processing apparatus can further include control means for describing, in an encoded image obtained by encoding the original image, a flag identifying generation of a prediction image to be added to an image to be decoded, by using unidirectional prediction, generation of a prediction image to be added to an image to be decoded, by using bidirectional prediction, or generation of a prediction image to be added to an image to be decoded, by applying a low-pass filter to a difference image between a plurality of motion compensation images, by applying a high-pass filter to an image obtained by applying a low-pass filter, and by adding the image obtained by applying a low-pass filter and an image obtained by applying a high-pass filter to one of the plurality of motion compensation images.

An image processing method according to the other aspect of the present invention includes a detecting step of detecting a motion vector on the basis of an image, which is obtained through local decoding on the basis of a residual image indicating a difference between an original image to be subjected to encoding and a prediction image, and on the basis of the original image; a motion compensating step of performing motion compensation using, as reference frames, a plurality of frames formed of images obtained through local decoding and using motion vectors detected in the detecting step, and for extracting a plurality of motion compensation images corresponding to the prediction image from different reference frames; a first filtering step of applying a low-pass filter to a difference image between the plurality of motion compensation images extracted in the motion compensating step; a second filtering step of applying a high-pass filter to an image obtained in the first filtering step by the application of a low-pass filter; and a prediction image generating step of generating the prediction image by adding the image obtained in the first filtering step by the application of a low-pass filter and an image obtained in the second filtering step by the application of a high-pass filter to one of the plurality of motion compensation images extracted in the motion compensating step.

In an aspect of the present invention, motion compensation is performed using, as reference frames, a plurality of frames formed of images obtained by decoding encoded images and using motion vectors included in the encoded images; a plurality of motion compensation images corresponding to a prediction image are generated from different reference frames; a low-pass filter is applied to a difference image between the plurality of generated motion compensation images; a high-pass filter is applied to an image obtained by the application of a low-pass filter; and the prediction image is generated by adding the image obtained by the application of a low-pass filter and an image obtained by the application of a high-pass filter to one of the plurality of generated motion compensation images.

In another aspect of the present invention, a motion vector is detected on the basis of an image, which is obtained through local decoding on the basis of a residual image indicating a difference between an original image to be subjected to encoding and a prediction image, and on the basis of the original image; motion compensation is performed using, as reference frames, a plurality of frames formed of images obtained through local decoding and using detected motion vectors; a plurality of motion compensation images corresponding to the prediction image are extracted from different reference frames; a low-pass filter is applied to a difference image between the plurality of extracted motion compensation images; a high-pass filter is applied to an image obtained by the application of a low-pass filter; and the prediction image is generated by adding the image obtained by the application of a low-pass filter and an image obtained by the application of a high-pass filter to one of the plurality of extracted motion compensation images.

Advantageous Effects of Invention

According to the present invention, a high-accuracy prediction image can be generated without an increase in processing load.

DESCRIPTION OF EMBODIMENTS

Figure 3:
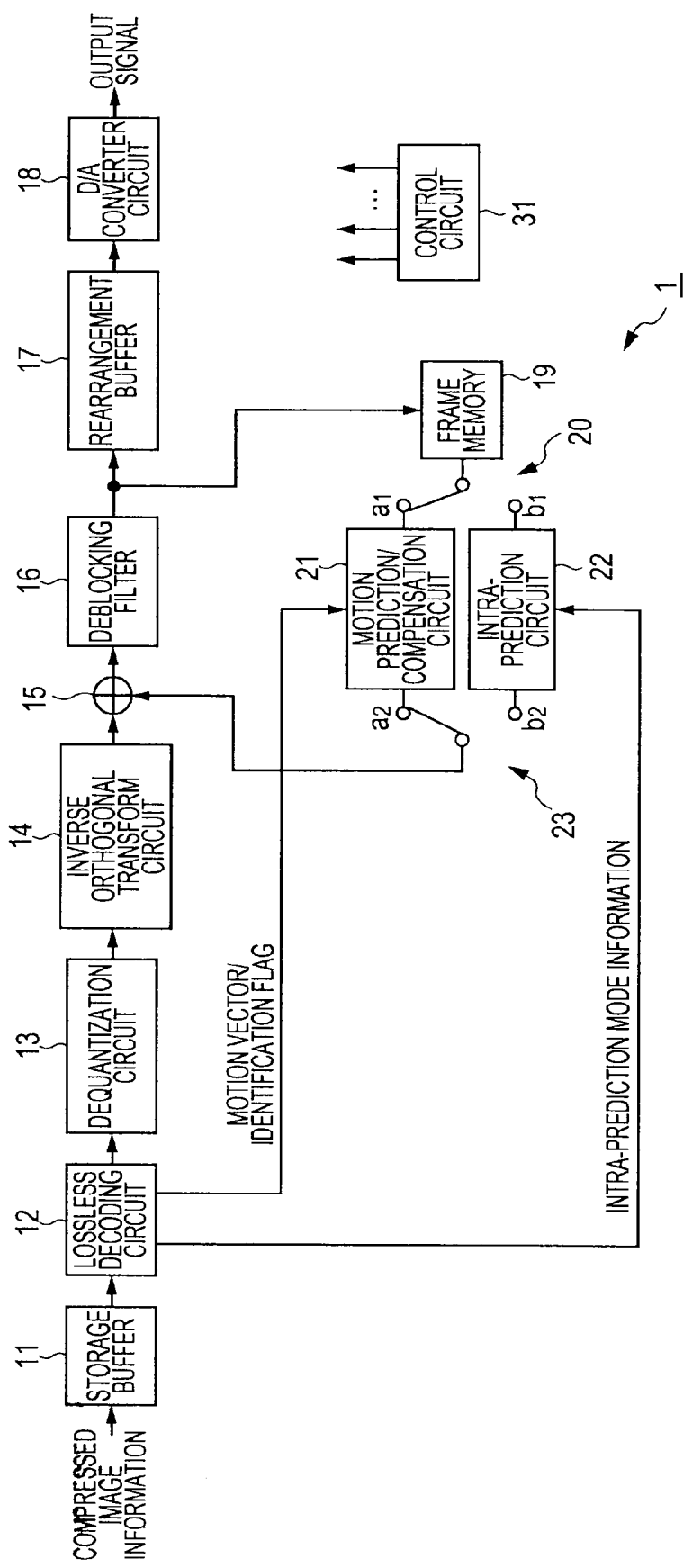
FIG. 3 is a block diagram illustrating an example configuration of a decoding apparatus according to an embodiment of the present invention.

FIG. 3 is a block diagram illustrating an example configuration of a decoding apparatus 1 according to an embodiment of the present invention.

Image information compressed and encoded by an encoding apparatus described below is input to the decoding apparatus 1 via a cable, a network, or a removable medium. The compressed image information is image information compressed and encoded in accordance with, for example, the H.264 standard.

A storage buffer 11 sequentially stores bit streams input as compressed image information. The information stored in the storage buffer 11 is read by a lossless decoding circuit 12 in units of images of certain units such as macroblocks forming a frame, as necessary. In the H.264 standard, it is also possible to perform processing instead of in units of macroblocks of 16×16 pixels, in units of blocks into which the macroblocks are further divided, such as those of 8×8 pixels or 4×4 pixels.

The lossless decoding circuit 12 performs a decoding process corresponding to an encoding scheme, such as a variable-length decoding process or an arithmetic decoding process, on an image read from the storage buffer 11. The lossless decoding circuit 12 outputs a quantized transform coefficient, which is obtained by performing the decoding process, to a dequantization circuit 13.

Furthermore, the lossless decoding circuit 12 identifies, based on an identification flag included in the header of the image to be subjected to decoding, whether the image is an intra-coded image or an inter-coded image. In a case where it is judged that the image to be subjected to decoding is an intra-coded image, the lossless decoding circuit 12 outputs intra-prediction mode information stored in the header of the image to an intra-prediction circuit 22. The intra-prediction mode information includes information regarding intra-prediction, such as the size of a block used as the unit of the process.

In a case where it is judged that the image to be subjected to decoding is inter-coded information, the lossless decoding circuit 12 outputs a motion vector and an identification flag that are stored in the header of the image to a motion prediction/compensation circuit 21. The mode of prediction in which a prediction image is to be generated through inter-prediction is identified using the identification flag. Identification flags are set in units of, for example, macroblocks or frames.

Figure 1:
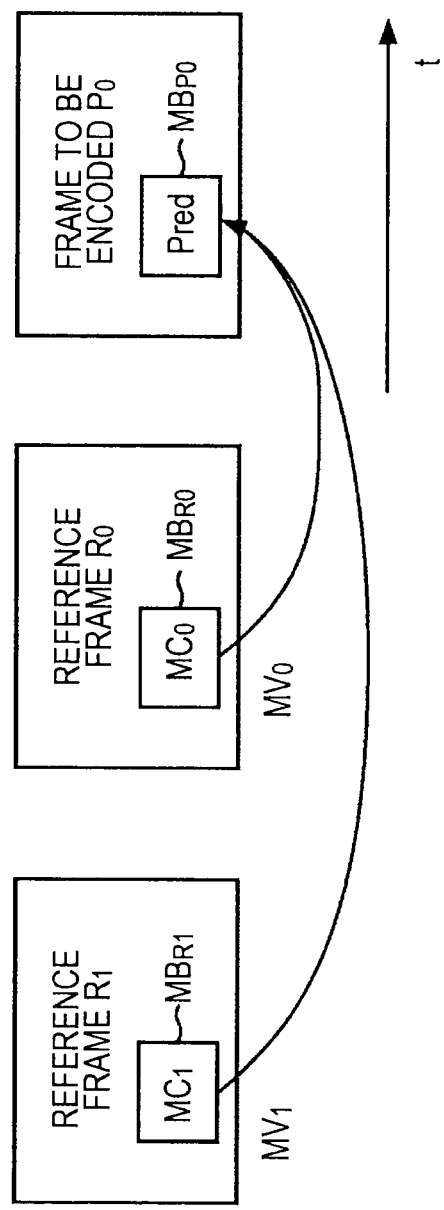
FIG. 1 is a diagram illustrating an example of unidirectional prediction.
Figure 2:
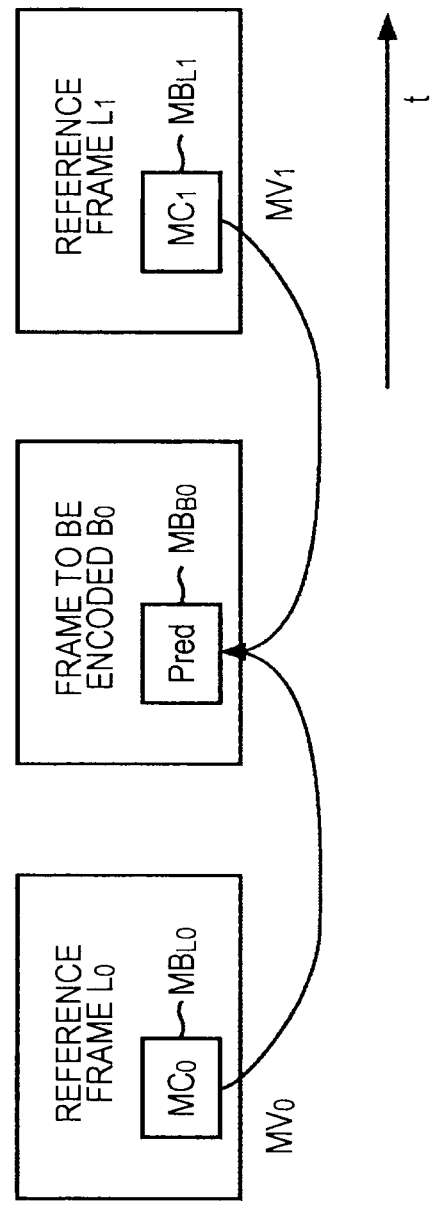
FIG. 2 is a diagram illustrating an example of bidirectional prediction.

In addition to the mode of unidirectional prediction in FIG. 1 and the mode of bidirectional prediction in FIG. 2, a third prediction mode for generating a prediction image by applying a filter to a motion compensation image extracted from a plurality of reference frames located in one temporal direction or both directions is provided as the mode of prediction.

Figure 4:
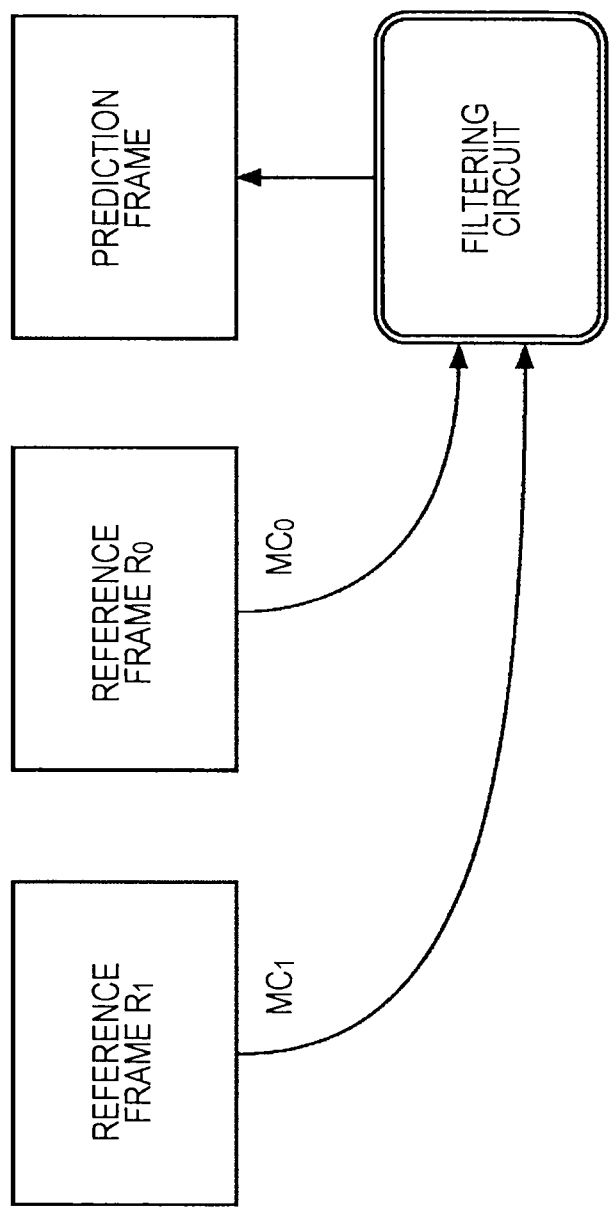
FIG. 4 is a diagram illustrating a concept of a third prediction mode.

FIG. 4 is a diagram illustrating a concept of the third prediction mode.

In an example of FIG. 4, a frame that is one time point previous in time to a current frame (prediction frame) is set as a reference frame $R_0$, and a frame one time point previous to the reference frame $R_0$ is set as a reference frame $R_1$. In this case, according to the third prediction mode, motion compensation images $MC_0$ and $MC_1$ extracted from the reference frames $R_0$ and $R_1$ are input to a filtering circuit, and the pixel value of an image output from the filtering circuit is set as a pixel value of a prediction image of the macroblock of interest.

Hereinafter, the mode of prediction in which the pixel value of one motion compensation image among motion compensation images extracted from a plurality of reference frames located in one direction, as described with reference to FIG. 1, is set as a pixel value of a prediction image is simply referred to as a unidirectional prediction mode. Furthermore, as described with reference to FIG. 2, the mode of prediction in which the average value of the pixel values of motion compensation images individually extracted from a plurality of reference frames located in both directions is set as the pixel value of a prediction image is simply referred to as a bidirectional prediction mode.

The third mode of prediction as illustrated in FIG. 4 in which the pixel values of a prediction image are determined by applying a filter to each of motion compensation images extracted from a plurality of reference frames located in one direction or both directions is referred to as a filtering prediction mode. The filtering prediction mode will be described in detail below.

Referring back to FIG. 3, the dequantization circuit 13 performs dequantization on the quantized transform coefficient supplied from the lossless decoding circuit 12 using a scheme corresponding to the quantization scheme used on the encoding side. The dequantization circuit 13 outputs a transform coefficient obtained by performing dequantization to an inverse orthogonal transform circuit 14.

The inverse orthogonal transform circuit 14 performs, for example, a fourth-order inverse orthogonal transform on the transform coefficient supplied from the dequantization circuit 13 using a scheme corresponding to the orthogonal transform scheme on the encoding side, such as the discrete cosine transform or Karhunen-Loève transform, and outputs an obtained image to an adder circuit 15.

The adder circuit 15 combines the decoded image supplied from the inverse orthogonal transform circuit 14 and a prediction image supplied from the motion prediction/compensation circuit 21 or from the intra-prediction circuit 22 via a switch 23, and outputs a composite image to a deblocking filter 16.

The deblocking filter 16 removes block noise included in the image supplied from the adder circuit 15, and outputs an image from which the block noise has been removed. The image output from the deblocking filter 16 is supplied to a rearrangement buffer 17 and a frame memory 19.

The rearrangement buffer 17 temporarily stores the image supplied from the deblocking filter 16. The rearrangement buffer 17 generates an individual frame from an image of, for example, every macroblock that is stored, and rearranges the generated frames in certain order such as display order before outputting them to a D/A (Digital/Analog) converter circuit 18.

The D/A converter circuit 18 performs D/A conversion on each of the frames supplied from the rearrangement buffer 17, and outputs the signals of the frames to outside.

The frame memory 19 temporarily stores the image supplied from the deblocking filter 16. The information stored in the frame memory 19 is supplied to the motion prediction/compensation circuit 21 or the intra-prediction circuit 22 via a switch 20.

The switch 20 is connected to a terminal $a_1$ in a case where a prediction image is to be generated through inter-prediction, and is connected to a terminal $b_1$ in a case where a prediction image is generated through intra-prediction. The switching of the switch 20 is controlled by, for example, a control circuit 31.

The motion prediction/compensation circuit 21 determines a prediction mode in accordance with the identification flag supplied from the lossless decoding circuit 12, and selects a frame to be used as a reference frame, from among already decoded frames that are stored in the frame memory 19, in accordance with the prediction mode. The motion prediction/compensation circuit 21 determines a macroblock corresponding to the prediction image of interest from among macroblocks forming the reference frame on the basis of the motion vector supplied from the lossless decoding circuit 12, and extracts the determined macroblock as a motion compensation image. The motion prediction/compensation circuit 21 determines the pixel value of the prediction image from the pixel value of the motion compensation image in accordance with the prediction mode, and outputs the prediction image whose pixel value has been determined to the adder circuit 15 via the switch 23.

The intra-prediction circuit 22 performs intra-prediction in accordance with the intra-prediction mode information supplied from the lossless decoding circuit 12, and generates a prediction image. The intra-prediction circuit 22 outputs the generated prediction image to the adder circuit 15 via the switch 23.

The switch 23 is connected to a terminal $a_2$ in a case where a prediction image has been generated by the motion prediction/compensation circuit 21, and is connected to a terminal $b_2$ in a case where a prediction image has been generated by the intra-prediction circuit 22. The switching of the switch 23 is also controlled by, for example, the control circuit 31.

The control circuit 31 controls the overall operation of the decoding apparatus 1 by, for example, switching the connection of the switches 20 and 23. The control circuit 31 may identify whether the image to be subjected to processing is an intra-coded image or an inter-coded image.

Figure 5:
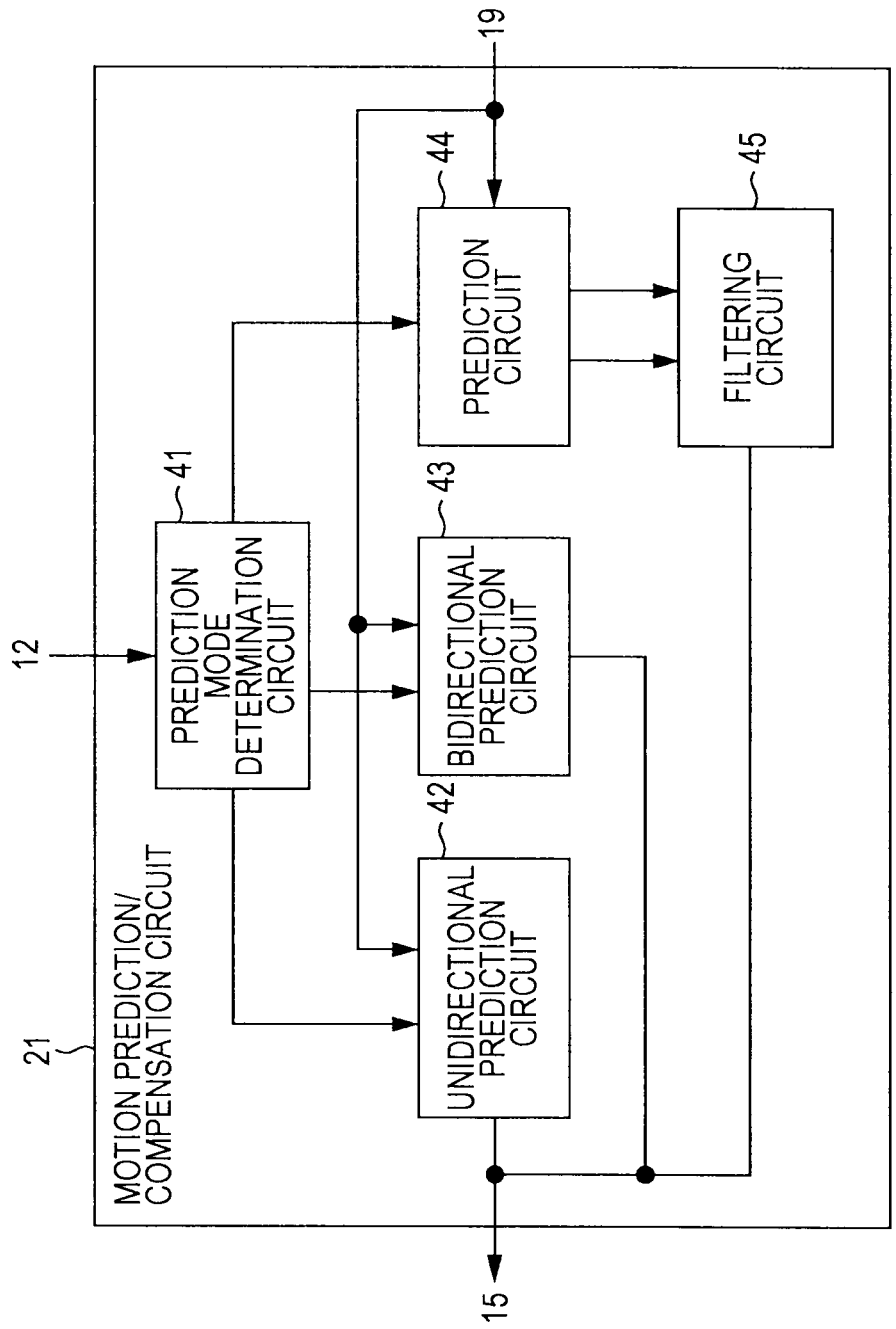
FIG. 5 is a block diagram illustrating an example configuration of a motion prediction/compensation circuit in FIG. 3.

FIG. 5 is a block diagram illustrating an example configuration of the motion prediction/compensation circuit 21 in FIG. 3.

As illustrated in FIG. 5, the motion prediction/compensation circuit 21 is composed of a prediction mode determination circuit 41, a unidirectional prediction circuit 42, a bidirectional prediction circuit 43, a prediction circuit 44, and a filtering circuit 45. The motion vector and identification flag supplied from the lossless decoding circuit 12 are input to the prediction mode determination circuit 41.

The prediction mode determination circuit 41 determines a prediction mode in accordance with the identification flag supplied from the lossless decoding circuit 12. The prediction mode determination circuit 41 outputs the motion vector to the unidirectional prediction circuit 42 in a case where it is determined that a prediction image is to be generated through unidirectional prediction, and outputs the motion vector to the bidirectional prediction circuit 43 in a case where it is determined that a prediction image is to be generated through bidirectional prediction. Furthermore, in a case where it is determined that a prediction image is to be generated through filtering prediction, the prediction mode determination circuit 41 outputs the motion vector to the prediction circuit 44.

In this manner, it is made possible to set, as the value of an identification flag, a value different from a value representing unidirectional prediction and a value representing bidirectional prediction, which are defined in the conventional H.264 standard, in order to allow identification of filtering prediction. Note that a prediction mode may be determined using a method determined in advance, instead of being determined in accordance with an identification flag, to reduce the amount of information.

The unidirectional prediction circuit 42 sets, as illustrated in FIG. 1, a plurality of frames located in one temporal direction as reference frames, and determines macroblocks in the reference frames corresponding to a prediction image on the basis of motion vectors. Furthermore, the unidirectional prediction circuit 42 generates a prediction image by reading each of the determined macroblocks in the reference frames from the frame memory 19 as a motion compensation image and by setting the pixel values of one of the motion compensation images as the pixel values of the prediction image. The unidirectional prediction circuit 42 outputs the prediction image to the adder circuit 15. For example, unidirectional prediction defined in the H.264 standard is used as the unidirectional prediction performed by the unidirectional prediction circuit 42.

The bidirectional prediction circuit 43 sets, as illustrated in FIG. 2, a plurality of frames located in temporal both directions as reference frames, and determines macroblocks in the reference frames corresponding to a prediction image on the basis of motion vectors. Furthermore, the bidirectional prediction circuit 43 generates a prediction image by reading each of the determined macroblocks in the reference frames from the frame memory 19 as a motion compensation image and by setting the averages of the pixel values of the read motion compensation images as the pixel values of the prediction image. The bidirectional prediction circuit 43 outputs the prediction image to the adder circuit 15. For example, bidirectional prediction defined in the H.264 standard is used as the bidirectional prediction performed by the bidirectional prediction circuit 43.

The prediction circuit 44 determines a plurality of frames located in one temporal direction or both directions as reference frames. Which frames are to be used as reference frames may be determined in advance or may be specified by information transmitted from the encoding side together with an identification flag.

Figure 6:
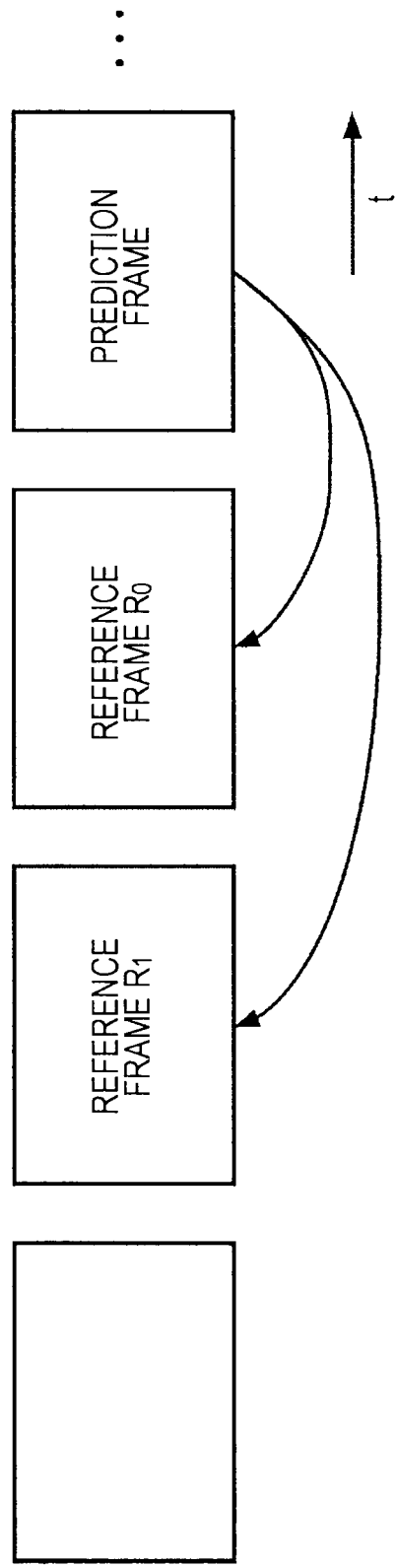
FIG. 6 is a diagram illustrating an example of reference frames.

FIG. 6 is a diagram illustrating an example of reference frames.

In the example of FIG. 6, similarly to the description with reference to FIG. 4, two frames that are respectively one time point and further one time point previous in time to a prediction frame are set as reference frames. Among the two reference frames, the one-time-point preceding frame that is closer to the prediction frame is set as a reference frame $R_0$, and the frame one time point previous to the reference frame $R_0$ is set as a reference frame $R_1$.

Figure 7:
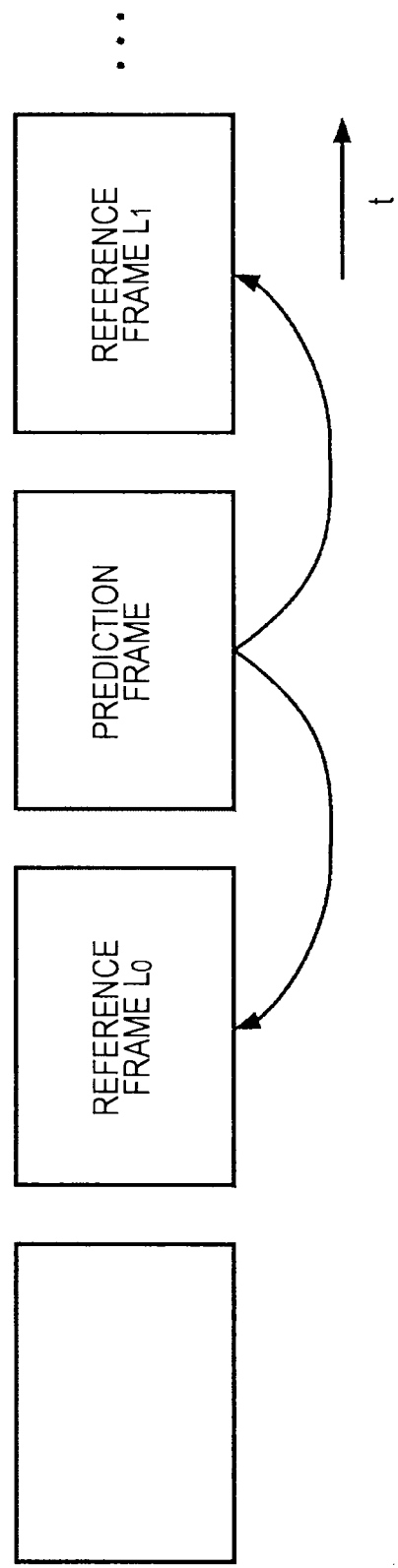
FIG. 7 is a diagram illustrating another example of reference frames.

FIG. 7 is a diagram illustrating another example of reference frames.

In the example of FIG. 7, two frames that are one time point previous and one time point subsequent in time to the time point of a prediction frame are set as reference frames. Among the two reference frames, the frame one time point previous to the prediction frame is set as a reference frame $L_0$, and the frame one time point subsequent to the prediction frame is set as a reference frame $L_1$.

In this manner, in filtering prediction, a plurality of frames located in one temporal direction or a plurality of frames located in both directions are used as reference frames.

Furthermore, the prediction circuit 44 determines macroblocks corresponding to the prediction image, among already decoded macroblocks in the reference frames determined in the manner as illustrated in FIG. 6 or 7, on the basis of the motion vectors supplied from the prediction mode determination circuit 41.

The prediction circuit 44 reads each of the determined macroblocks in the reference frames from the frame memory 19 as a motion compensation image, and outputs the read motion compensation images to the filtering circuit 45. Motion vectors may be performed, instead of in units of macroblocks such as those of 16×16 pixels, in units of blocks into which the macroblocks are further divided. An image of, for example, every macroblock is input to the filtering circuit 45. In FIG. 5, the representation of two arrows as arrows directed from the prediction circuit 44 to the filtering circuit 45 indicates that two motion compensation images are supplied.

The filtering circuit 45 receives, as inputs, the motion compensation images supplied from the prediction circuit 44, performs filtering, and outputs a prediction image obtained by performing filtering to the adder circuit 15.

Figure 8:
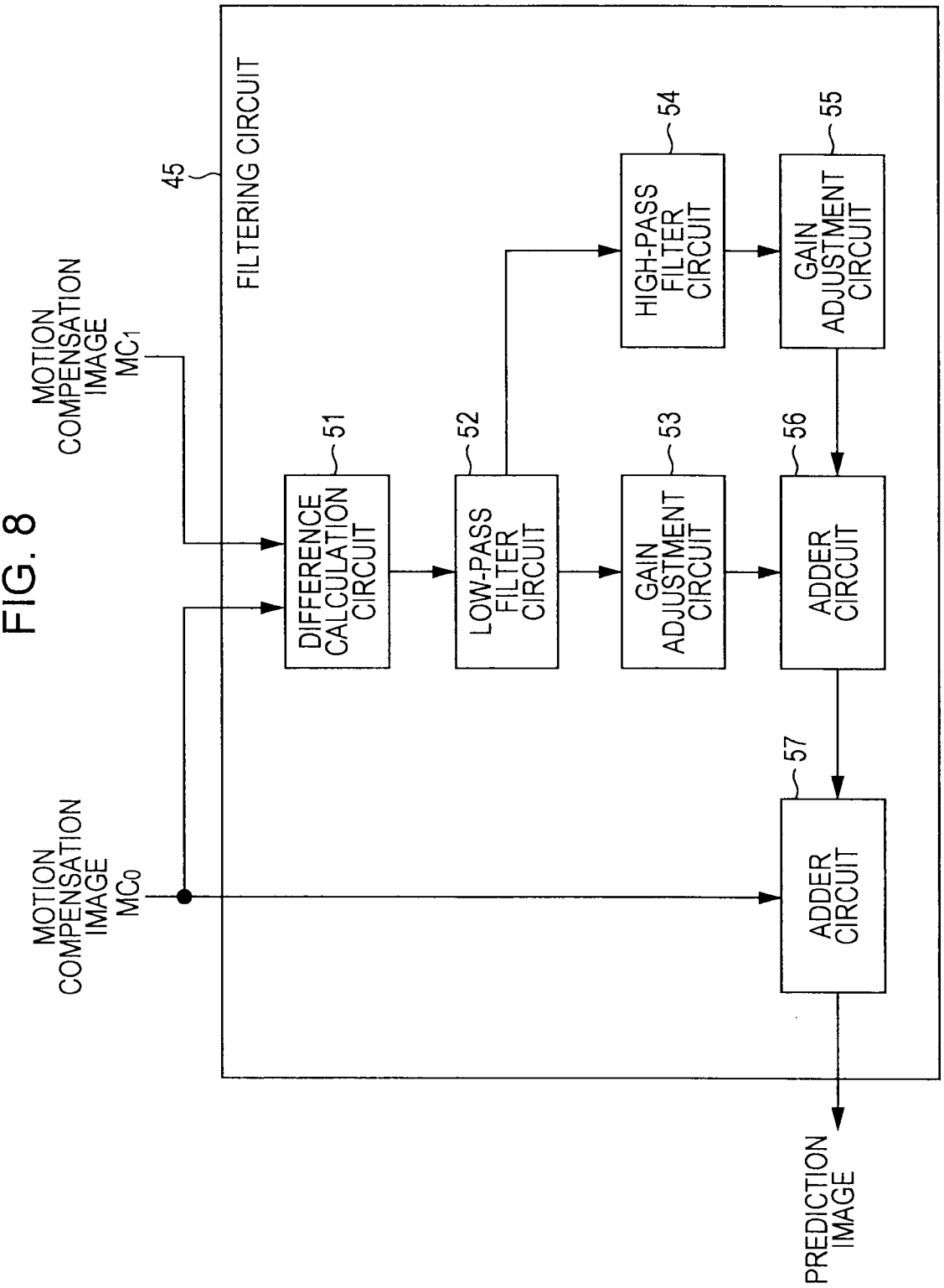
FIG. 8 is a block diagram illustrating an example configuration of a filtering circuit in FIG. 5.

FIG. 8 is a block diagram illustrating an example configuration of the filtering circuit 45. In the filtering circuit 45 having the configuration of FIG. 8, filtering is performed on a signal in the time domain.

As illustrated in FIG. 8, the filtering circuit 45 is composed of a difference calculation circuit 51, a low-pass filter circuit 52, a gain adjustment circuit 53, a high-pass filter circuit 54, a gain adjustment circuit 55, an adder circuit 56, and an adder circuit 57. The motion compensation image $MC_0$ supplied from the prediction circuit 44 is input to the difference calculation circuit 51 and the adder circuit 57, and the motion compensation image $MC_1$ is input to the difference calculation circuit 51.

In a case where, as illustrated in FIG. 6, a prediction image is generated through unidirectional prediction, for example, an image extracted from the reference frame $R_0$, which is regarded as having a higher correlation with the prediction image, is set as the motion compensation image $MC_0$, and an image extracted from the reference frame $R_1$ is set as the motion compensation image $MC_1$. The image extracted from the reference frame $R_0$ may be set as the motion compensation image $MC_1$, and the image extracted from the reference frame $R_1$ may be set as the motion compensation image $MC_0$.

In contrast, in a case where, as illustrated in FIG. 7, a prediction image is generated through bidirectional prediction, for example, an image extracted from the one-time-point preceding reference frame $L_0$ is set as the motion compensation image $MC_0$, and an image extracted from the one-time-point subsequent reference frame $L_1$ is set as the motion compensation image $MC_1$. The image extracted from the reference frame $L_0$ may be set as the motion compensation image $MC_1$, and the image extracted from the reference frame $L_1$ may be set as the motion compensation image $MC_0$.

The difference calculation circuit 51 calculates the difference between the motion compensation image $MC_0$ and the motion compensation image $MC_1$, and outputs a difference image to the low-pass filter circuit 52. The difference image D is represented by Equation (3) as follows.
[Math. 3]

$$D(i,j)=MC_0(i,j)-MC_1(i,j) \quad (3)$$

In Equation (3), (i, j) represents the relative position of a pixel in a motion compensation image, and satisfies 0≤i≤16 and 0≤j≤16 in a case where the processing is performed in units of macroblocks of 16×16 pixels. It is assumed that the same applies in the following.

The low-pass filter circuit 52 has an FIR filter circuit. The low-pass filter circuit 52 applies a low-pass filter to the difference image D supplied from the difference calculation circuit 51, and outputs an obtained image to the gain adjustment circuit 53 and the high-pass filter circuit 54. A difference image D', which is an image obtained by applying a low-pass filter, is represented by Equation (4) below. In Equation (4), LPF(X) represents the application of a low-pass filter to an input image X using a two-dimensional FIR filter.
[Math. 4]

$$D'=LPF(D) \quad (4)$$

The gain adjustment circuit 53 adjusts the gain of the difference image D' supplied from the low-pass filter circuit 52, and outputs the image for which the gain has been adjusted to the adder circuit 56. The output image X(i, j) of the gain adjustment circuit 53 is represented by Equation (5) as follows.
[Math. 5]

$$X(i,j)=\alpha D'(i,j) \quad (5)$$

The high-pass filter circuit 54 has an FIR filter circuit. The high-pass filter circuit 54 applies a high-pass filter to the difference image D' supplied from the low-pass filter circuit 52, and outputs an obtained image to the gain adjustment circuit 55. A difference image D", which is an image obtained by applying a high-pass filter, is represented by Equation (6) below. In Equation (6), HPF(X) represents the application of a high-pass filter to an input image X using a two-dimensional FIR filter.
[Math. 6]

$$D''=HPF(D') \quad (6)$$

The gain adjustment circuit 55 adjusts the gain of the difference image D" supplied from the high-pass filter circuit 54, and outputs the image for which the gain has been adjusted to the adder circuit 56. The output image Y(i, j) of the gain adjustment circuit 55 is represented by Equation (7) as follows.
[Math. 7]

$$Y(i,j)=\beta D''(i,j) \quad (7)$$

As the values of α in Equation (5) and β in Equation (7), for example, values such as α=0.8 and β=0.2 are selected. However, other values may be used in order to increase the accuracy of a prediction pixel. Furthermore, the values may be adaptively changed in accordance with the properties of an input sequence or the like.

The adder circuit 56 adds the image X(i, j) and image Y(i, j) for which the gain has been adjusted, and outputs an image obtained by addition. The output image Z(i, j) of the adder circuit 56 is represented by Equation (8) as follows.
[Math. 8]

$$Z(i,j)=X(i,j)+Y(i,j) \quad (8)$$

The output image Z(i, j) is an representation of the high-frequency components of the image, which can be determined from the difference, that is, the correlation, between the motion compensation image $MC_0$ and the motion compensation image $MC_1$.

The adder circuit 57 adds the output image Z(i, j) supplied from the adder circuit 56 to the motion compensation image $MC_0$, and outputs an obtained image to the adder circuit 15 as a prediction image. The final output of the adder circuit 57, i.e., a prediction image S(i, j), is represented by Equation (9) as follows.
[Math. 9]

$$S(i,j)=MC_0(i,j)+Z(i,j) \quad (9)$$

In this manner, according to the filtering prediction mode, an image obtained by adding an image representing high-frequency components to the motion compensation image $MC_0$ is generated as a prediction image. This prediction image includes more high-frequency components than a prediction image obtained in a case where bidirectional prediction is simply performed. As described above, since the averages of the pixel values of a plurality of motion compensation images are determined as pixel values, a prediction image generated by performing bidirectional prediction may be that from which the high-frequency components are lost.

Furthermore, since a prediction image including a large number of high-frequency components is added with a decoded image in the adder circuit 15, an image that is finally output from the decoding apparatus 1 is also a high-definition image including a large number of high-frequency components.

Further, it is possible to generate a prediction image by more efficiently utilizing the time correlation of images than that in a case where unidirectional prediction is simply performed. As described above, since the pixel values of one motion compensation image among a plurality of motion compensation images are used, a prediction image generated through unidirectional prediction cannot be said to be that generated sufficiently utilizing the time correlation of images.

Here, a process of the decoding apparatus 1 having the foregoing configuration will be described.

First, a decoding process of the decoding apparatus 1 will be described with reference to a flowchart of FIG. 9.

Figure 9:
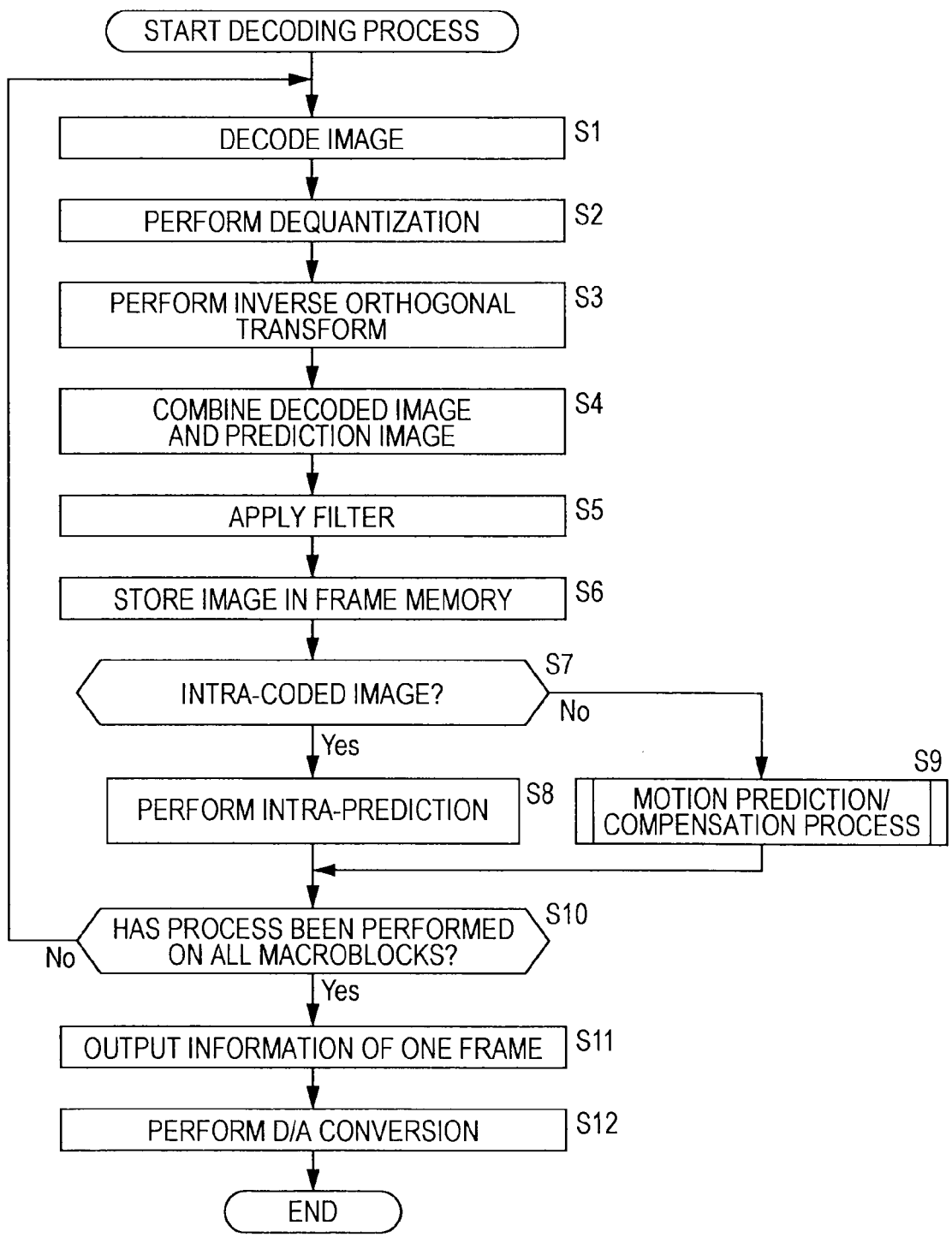
FIG. 9 is a flowchart describing a decoding process of the decoding apparatus.

The process of FIG. 9 is started when, for example, an image of a certain size such as a macroblock of 16×16 pixels is read by the lossless decoding circuit 12 from the information stored in the storage buffer 11. The processing of each step of FIG. 9 is performed, as necessary, in parallel with the processing of another step or by reordering the steps. The same applies to the processing of each step in each flowchart described below.

In step S1, the lossless decoding circuit 12 performs a decoding process on an image read from the storage buffer 11, and outputs a quantized transform coefficient to the dequantization circuit 13. Furthermore, the lossless decoding circuit 12 outputs intra-prediction mode information to the intra-prediction circuit 22 in a case where the image to be subjected to decoding is an intra-coded image, and outputs a motion vector and an identification flag to the motion prediction/compensation circuit 21 in a case where the image is an inter-coded image.

In step S2, the dequantization circuit 13 performs dequantization using a scheme corresponding to the quantization scheme used on the encoding side, and outputs the transform coefficient to the inverse orthogonal transform circuit 14.

In step S3, the inverse orthogonal transform circuit 14 performs an inverse orthogonal transform on the transform coefficient supplied from the dequantization circuit 13, and outputs an obtained image to the adder circuit 15.

In step S4, the adder circuit 15 combines the decoded image supplied from the inverse orthogonal transform circuit 14 and a prediction image supplied from the motion prediction/compensation circuit 21 or the intra-prediction circuit 22, and outputs a composite image to the deblocking filter 16.

In step S5, the deblocking filter 16 performs filtering to remove block noise included in the composite image, and outputs an image from which block noise has been removed.

In step S6, the frame memory 19 temporarily stores the image supplied from the deblocking filter 16.

In step S7, the control circuit 31 determines whether or not the image of interest is an intra-coded image.

In a case where it is determined in step S7 that the image is an intra-coded image, then, in step S8, the intra-prediction circuit 22 generates a prediction image by performing intra-prediction, and outputs the generated prediction image to the adder circuit 15.

In contrast, in a case where it is determined in step S7 that the image is not an intra-coded image, that is, an inter-coded image, then, in step S9, the motion prediction/compensation circuit 21 performs a motion prediction/compensation process. A prediction image generated by performing a motion prediction/compensation process is output to the adder circuit 15. The motion prediction/compensation process will be described below with reference to a flowchart of FIG. 10.

In step S10, the control circuit 31 determines whether or not the foregoing process has been performed on the macroblocks in one entire frame. In a case where it is determined that the process has not been performed, the process from step S1 is repeatedly performed on another macroblock.

In contrast, in a case where it is determined in step S10 that the process has been performed on the macroblocks in one entire frame, then, in step S11, the rearrangement buffer 17 outputs the generated frame to the D/A converter circuit 18 in accordance with the control by the control circuit 31.

In step S12, the D/A converter circuit 18 performs D/A conversion on the frame supplied from the rearrangement buffer 17, and outputs an analog signal to outside. The foregoing process is performed on individual frames.

Figure 10:
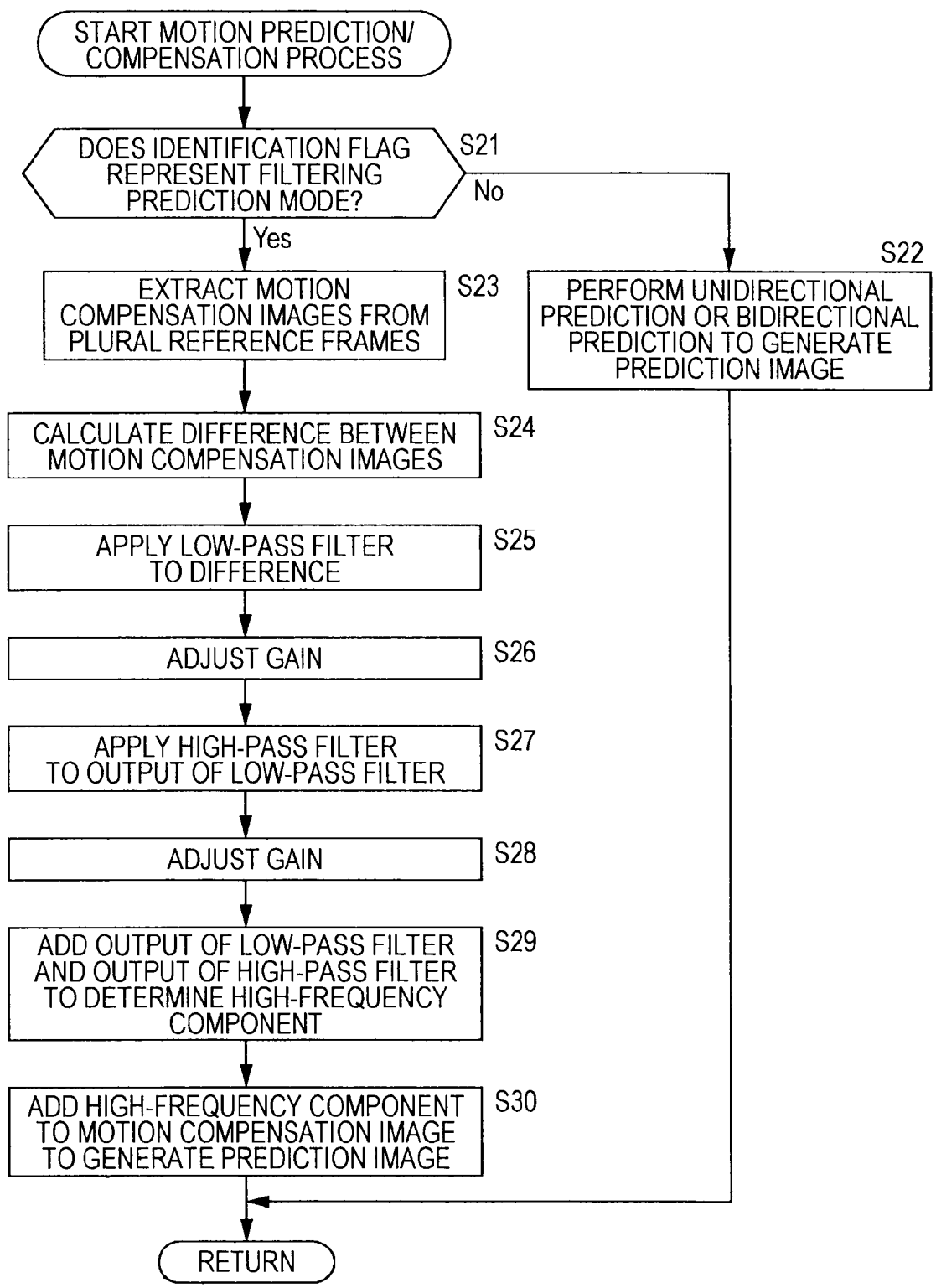
FIG. 10 is a flowchart describing a motion prediction/compensation process performed in step S9 of FIG. 9.

Next, the motion prediction/compensation process performed in step S9 of FIG. 9 will be described with reference to a flowchart of FIG. 10.

In step S21, the prediction mode determination circuit 41 of the motion prediction/compensation circuit 21 determines whether or not the identification flag supplied from the lossless decoding circuit 12 indicates that the processing is to be performed in the filtering prediction mode.

In a case where it is determined in step S21 that the identification flag does not indicate that the processing is to be performed in the filtering prediction mode, then, in step S22, unidirectional prediction or bidirectional prediction is performed, and a prediction image is generated.

That is, in a case where the identification flag indicates that the processing is to be performed in the unidirectional prediction mode, a motion vector is supplied from the prediction mode determination circuit 41 to the unidirectional prediction circuit 42, and the unidirectional prediction circuit 42 performs unidirectional prediction. Furthermore, in a case where the identification flag indicates that the processing is to be performed in the bidirectional prediction mode, a motion vector is supplied from the prediction mode determination circuit 41 to the bidirectional prediction circuit 43, and the bidirectional prediction circuit 43 performs bidirectional prediction. After the prediction image is output to the adder circuit 15, the process returns to step S9 of FIG. 9, and the subsequent processing is performed.

In contrast, in a case where it is determined in step S21 that the identification flag indicates that the processing is to be performed in the filtering prediction mode, then, in step S23, the prediction circuit 44 extracts a motion compensation image from each of a plurality of reference frames, and outputs the motion compensation images to the filtering circuit 45. A motion vector is supplied from the prediction mode determination circuit 41 to the prediction circuit 44, and a motion compensation image is extracted using it.

In step S24, the difference calculation circuit 51 of the filtering circuit 45 calculates the difference between the motion compensation image $MC_0$ and the motion compensation image $MC_1$, and outputs a difference image to the low-pass filter circuit 52.

In step S25, the low-pass filter circuit 52 applies a low-pass filter to the difference image supplied from the difference calculation circuit 51, and outputs an obtained image to the gain adjustment circuit 53 and the high-pass filter circuit 54.

In step S26, the gain adjustment circuit 53 adjusts the gain of the image supplied from the low-pass filter circuit 52, and outputs the image for which the gain has been adjust to the adder circuit 56.

In step S27, the high-pass filter circuit 54 applies a high-pass filter to the difference image supplied from the low-pass filter circuit 52, and outputs an obtained image to the gain adjustment circuit 55.

In step S28, the gain adjustment circuit 55 adjusts the gain of the difference image supplied from the high-pass filter circuit 54, and outputs the image for which the gain has been adjusted to the adder circuit 56.

In step S29, the adder circuit 56 adds the image supplied from the gain adjustment circuit 53 and the image supplied from the gain adjustment circuit 55, and determines the high-frequency components of the images. The determined high-frequency components are supplied from the adder circuit 56 to the adder circuit 57.

In step S30, the adder circuit 57 adds the image (high-frequency components) supplied from the adder circuit 56 to the motion compensation image $MC_0$, and outputs an obtained image to the adder circuit 15 as a prediction image. After that, the process returns to step S9 of FIG. 9, and the subsequent processing is performed.

As above, decoding is performed using a prediction image generated through filtering prediction, thus making it possible to obtain a high-definition decoded image.

Next, the configuration and operation of an apparatus on the encoding side will be described.

Figure 11:
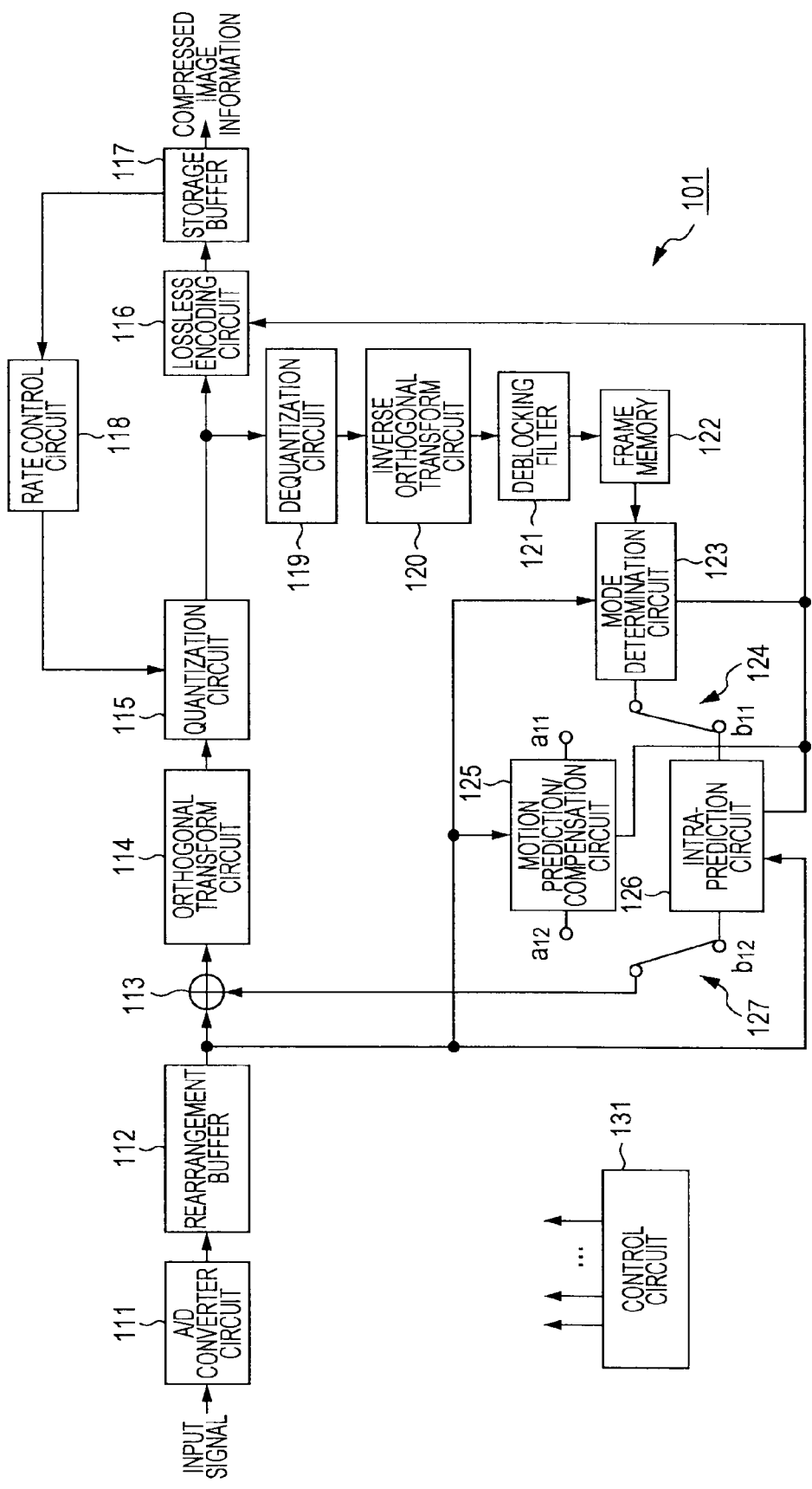
FIG. 11 is a block diagram illustrating an example configuration of an encoding apparatus.

FIG. 11 is a block diagram illustrating an example configuration of an encoding apparatus 101. Compressed image information obtained through encoding by the encoding apparatus 101 is input to the decoding apparatus 1 in FIG. 3.

An A/D converter circuit 111 performs A/D conversion on an input signal, and outputs an image to a rearrangement buffer 112.

The rearrangement buffer 112 rearranges frames in accordance with the GOP (Group of Pictures) structure of the compressed image information, and outputs an image of a certain unit such as a macroblock. The image output from the rearrangement buffer 112 is supplied to an adder circuit 113, a mode determination circuit 123, a motion prediction/compensation circuit 125, and an intra-prediction circuit 126.

The adder circuit 113 determines the difference between the image supplied from the rearrangement buffer 112 and a prediction image generated by the motion prediction/compensation circuit 125 or the intra-prediction circuit 126 and supplied via a switch 127, and outputs the residual error to an orthogonal transform circuit 114. The closer the prediction image is to an original image and the smaller the residual error determined is, the smaller the amount of code to be assigned to the residual error is and therefore the higher the encoding efficiency may be.

The orthogonal transform circuit 114 performs an orthogonal transform, such as the discrete cosine transform or Karhunen-Loève transform, on the residual error supplied from the adder circuit 113, and outputs a transform coefficient obtained by performing the orthogonal transform to a quantization circuit 115.

The quantization circuit 115 quantizes the transform coefficient supplied from the orthogonal transform circuit 114 in accordance with the control by a rate control circuit 118, and outputs the quantized transform coefficient. The transform coefficient quantized by the quantization circuit 115 is supplied to a lossless encoding circuit 116 and a dequantization circuit 119.

The lossless encoding circuit 116 compresses the transform coefficient supplied from the quantization circuit 115 by performing lossless encoding such as variable-length encoding or arithmetic encoding, and outputs information to a storage buffer 117.

Furthermore, the lossless encoding circuit 116 sets the value of an identification flag in accordance with the information supplied from the mode determination circuit 123, and describes the identification flag in the header of the image. As described above, the decoding apparatus 1 determines a prediction mode on the basis of the identification flag described by the lossless encoding circuit 116.

The lossless encoding circuit 116 also describes the information supplied from the motion prediction/compensation circuit 125 or the intra-prediction circuit 126 in the header of the image. Motion vectors and the like that are detected when inter-prediction is performed are supplied from the motion prediction/compensation circuit 125, and the information regarding the intra-prediction mode applied is supplied from the intra-prediction circuit 126.

The storage buffer 117 temporarily stores the information supplied from the lossless encoding circuit 116, and outputs it as compressed image information at a certain timing. The storage buffer 117 outputs information about the amount of code produced to the rate control circuit 118.

The rate control circuit 118 calculates a quantization scale on the basis of the amount of code output from the storage buffer 117, and controls the quantization circuit 115 so that the quantization can be performed with the calculated quantization scale.

The dequantization circuit 119 performs dequantization on the transform coefficient quantized by the quantization circuit 115, and outputs the transform coefficient to an inverse orthogonal transform circuit 120.

The inverse orthogonal transform circuit 120 performs an inverse orthogonal transform on the transform coefficient supplied from the dequantization circuit 119, and outputs an obtained image to a deblocking filter 121.

The deblocking filter 121 removes block noise that appears in a locally decoded image, and outputs an image from which the block noise has been removed to a frame memory 122.

The frame memory 122 stores the image supplied from the deblocking filter 121. The image stored in the frame memory 122 is read by a mode determination circuit 123 as necessary.

The mode determination circuit 123 determines whether intra-coding is to be performed or inter-coding is to be performed, on the basis of the image stored in the frame memory 122 and the original image supplied from the rearrangement buffer 112. Furthermore, in a case where it is determined that inter-coding is to be performed, the mode determination circuit 123 determines one mode among the unidirectional prediction mode, the bidirectional prediction mode, and the filtering prediction mode. The mode determination circuit 123 outputs information indicating a determination result to the lossless encoding circuit 116 as mode information.

In a case where it is determined that inter-coding is to be performed, the mode determination circuit 123 outputs a frame that is stored in the frame memory 122 and that is obtained through local decoding to the motion prediction/compensation circuit 125 via a switch 124.

Furthermore, in a case where it is determined that intra-coding is to be performed, the mode determination circuit 123 outputs a frame that is stored in the frame memory 122 and that is obtained through local decoding to the intra-prediction circuit 126.

The switch 124 is connected to a terminal $a_{11}$ in a case where inter-coding is to be performed, and is connected to a terminal $b_{11}$ in a case where intra-coding is to be performed. The switching of the switch 124 is controlled by, for example, a control circuit 131.

The motion prediction/compensation circuit 125 detects motion vectors on the basis of the original image supplied from the rearrangement buffer 112 and reference frames read from the frame memory 122, and outputs the detected motion vectors to the lossless encoding circuit 116. Furthermore, the motion prediction/compensation circuit 125 generates a prediction image by performing motion compensation using the detected motion vectors and the reference frames, and outputs the generated prediction image to the adder circuit 113 via the switch 127.

The intra-prediction circuit 126 performs intra-prediction on the basis of the original image supplied from the rearrangement buffer 112 and reference frames locally decoded and stored in the frame memory 122, and generates a prediction image. The intra-prediction circuit 126 outputs the generated prediction image to the adder circuit 113 via the switch 127, and outputs intra-prediction mode information to the lossless encoding circuit 116.

The switch 127 is connected to a terminal $a_{12}$ or a terminal $b_{12}$, and outputs a prediction image generated by the motion prediction/compensation circuit 125 or the intra-prediction circuit 126 to the adder circuit 113.

The control circuit 131 controls the overall operation of the encoding apparatus 101 by, for example, switching the connection of the switches 124 and 127 in accordance with the mode determined by the mode determination circuit 123.

Figure 12:
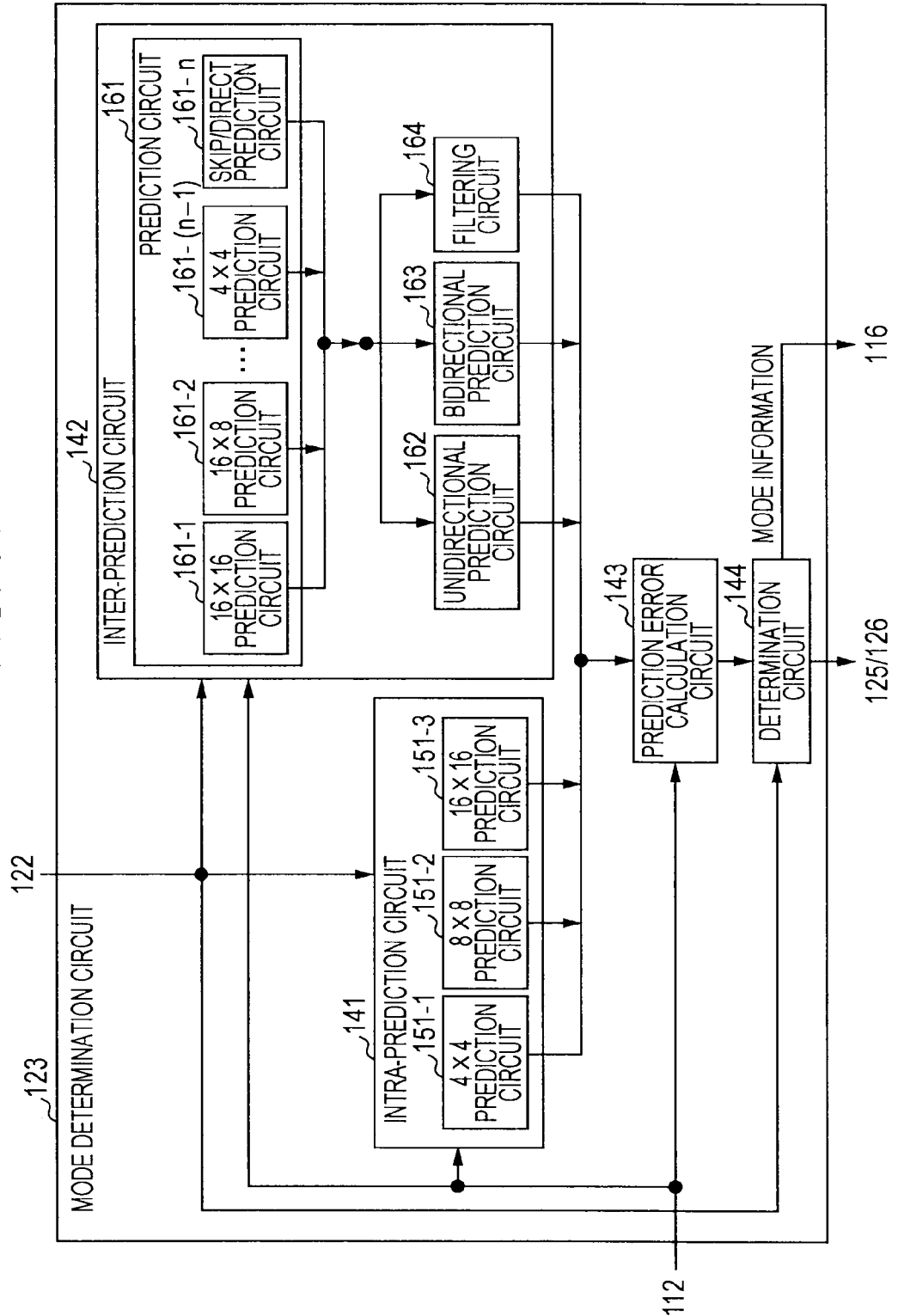
FIG. 12 is a block diagram illustrating an example configuration of a mode determination circuit in FIG. 11.

FIG. 12 is a block diagram illustrating an example configuration of the mode determination circuit 123 in FIG. 11.

As illustrated in FIG. 12, the mode determination circuit 123 is composed of an intra-prediction circuit 141, an inter-prediction circuit 142, a prediction error calculation circuit 143, and a determination circuit 144. In the mode determination circuit 123, intra-prediction or inter-prediction is performed on blocks each having a different size, and which prediction mode prediction is to be performed in is determined from the obtained result. As for inter-prediction, the processing is performed in each of the prediction modes, i.e., the unidirectional prediction mode, the bidirectional prediction mode, and the filtering prediction mode. The original image supplied from the rearrangement buffer 112 is input to the intra-prediction circuit 141, the inter-prediction circuit 142, and the prediction error calculation circuit 143.

The intra-prediction circuit 141 performs intra-prediction in units of blocks having different sizes on the basis of the original image and an image read from the frame memory 122, and outputs a generated prediction image to the prediction error calculation circuit 143. A 4×4 prediction circuit 151-1 performs intra-prediction in units of blocks of 4×4 pixels, and an 8×8 prediction circuit 151-2 performs intra-prediction in units of blocks of 8×8 pixels. A 16×16 prediction circuit 151-3 performs intra-prediction in units of blocks of 16×16 pixels.

A prediction circuit 161 in the inter-prediction circuit 142 detects motion vectors in units of blocks each having a different size on the basis of the original image and reference frames read from the frame memory 122. Furthermore, the prediction circuit 161 performs motion compensation on the basis of the detected motion vectors, and outputs motion compensation images that are used for the generation of a prediction image.

In a 16×16 prediction circuit 161-1, the processing is performed on image of every block of 16×16 pixels, and in a 16×8 prediction circuit 161-2, the processing is performed on an image of every block of 16×8 pixels. Furthermore, in a 4×4 prediction circuit 161-(n−1), the processing is performed on an image of every block of 4×4 pixels. In a skip/direct prediction circuit 161-n, motion vectors are detected in a skip prediction mode or a direct prediction mode, and motion compensation is performed using the detected motion vectors.

Motion compensation images that are extracted from a plurality of reference frames located unidirectionally with respect to the current frame are supplied from the respective circuits in the prediction circuit 161 to a unidirectional prediction circuit 162. Motion compensation images that are extracted from a plurality of reference frames located in both directions with respect to the current frame are supplied from the respective circuits in the prediction circuit 161 to a bidirectional prediction circuit 163.

In a case where filtering prediction is to be performed using, as described above, motion compensation images extracted from a plurality of reference frames located unidirectionally, motion compensation images that are extracted from reference frames located unidirectionally are supplied from the respective circuits in the prediction circuit 161 to a filtering circuit 164. In a case where filtering prediction is performed using motion compensation images extracted from a plurality of reference frames located in both directions, motion compensation images that are extracted from reference frames located in both directions are supplied from the respective circuits in the prediction circuit 161 to the filtering circuit 164.

The unidirectional prediction circuit 162 generates a prediction image by performing unidirectional prediction using each of the motion compensation images having different sizes, which are supplied from the respective circuits in the prediction circuit 161, and outputs the generated prediction image to the prediction error calculation circuit 143. For example, the unidirectional prediction circuit 162 generates a prediction image by using the pixel values of one image among a plurality of motion compensation images having 16×16 pixels, which are supplied from the prediction circuit 161-1, as the pixel values of a prediction image.

The bidirectional prediction circuit 163 generates a prediction image by performing bidirectional prediction using each of the motion compensation images having different sizes, which are supplied from the respective circuits in the prediction circuit 161, and outputs the generated prediction image to the prediction error calculation circuit 143. For example, the bidirectional prediction circuit 163 generates a prediction image by using the average values of the pixel values of a plurality of motion compensation images having 16×16 pixels, which are supplied from the prediction circuit 161-1, as the pixel values of a prediction image.

The filtering circuit 164 generates a prediction image by performing filtering prediction using each of the motion compensation images having different sizes, which are supplied from the respective circuits in the prediction circuit 161, and outputs the generated prediction image to the prediction error calculation circuit 143. The filtering circuit 164 has the same configuration as the configuration illustrated in FIG. 8 so as to correspond to the filtering circuit 45 of the decoding apparatus 1.

For example, in the case of generating a prediction image for the motion compensation images $MC_0$ and $MC_1$ each of 16×16 pixels, which are supplied from the prediction circuit 161-1, the filtering circuit 164 determines the difference between the motion compensation images $MC_0$ and $MC_1$, and applies a low-pass filter to a determined difference image. Furthermore, the filtering circuit 164 applies a high-pass filter to the output of the low-pass filter, and adds the image for which the gain of the output of the high-pass filter has been adjusted and the image for which the gain of the output of the low-pass filter has been adjusted. The filtering circuit 164 generates a prediction image by adding an image obtained as the result of addition, which represents the high-frequency components, with the motion compensation image $MC_0$, and outputs the generated prediction image to the prediction error calculation circuit 143.

The prediction error calculation circuit 143 determines the difference between each of the prediction images supplied from the respective circuits in the intra-prediction circuit 141 and the original image, and outputs a residual error signal representing the determined difference to the determination circuit 144. Furthermore, the prediction error calculation circuit 143 determines the difference between each of the prediction images supplied from the unidirectional prediction circuit 162, the bidirectional prediction circuit 163, and the filtering circuit 164 in the inter-prediction circuit 142 and the original image, and outputs a residual error signal representing the determined difference to the determination circuit 144.

The determination circuit 144 measures the intensity of the residual error signal supplied from the prediction error calculation circuit 143, and determines, as a prediction method for generating a prediction image to be used for encoding, a prediction method used for the generation of a prediction image having a small difference from the original image. The determination circuit 144 outputs information representing the determination result to the lossless encoding circuit 116 as mode information. The mode information also includes information representing the size of a block to be used as the unit of processing, and the like.

Furthermore, in a case where it is determined that a prediction image is to be generated through inter-prediction (in a case where it is determined that inter-coding is to be performed), the determination circuit 144 outputs reference frames read from the frame memory 122, together with the mode information, to the motion prediction/compensation circuit 125. In a case where it is determined that a prediction image is to be generated through intra-prediction (in a case where it is determined that intra-coding is to be performed), the determination circuit 144 outputs images used for intra-prediction, which are read from the frame memory 122, to the intra-prediction circuit 126 together with the mode information.

Figure 13:
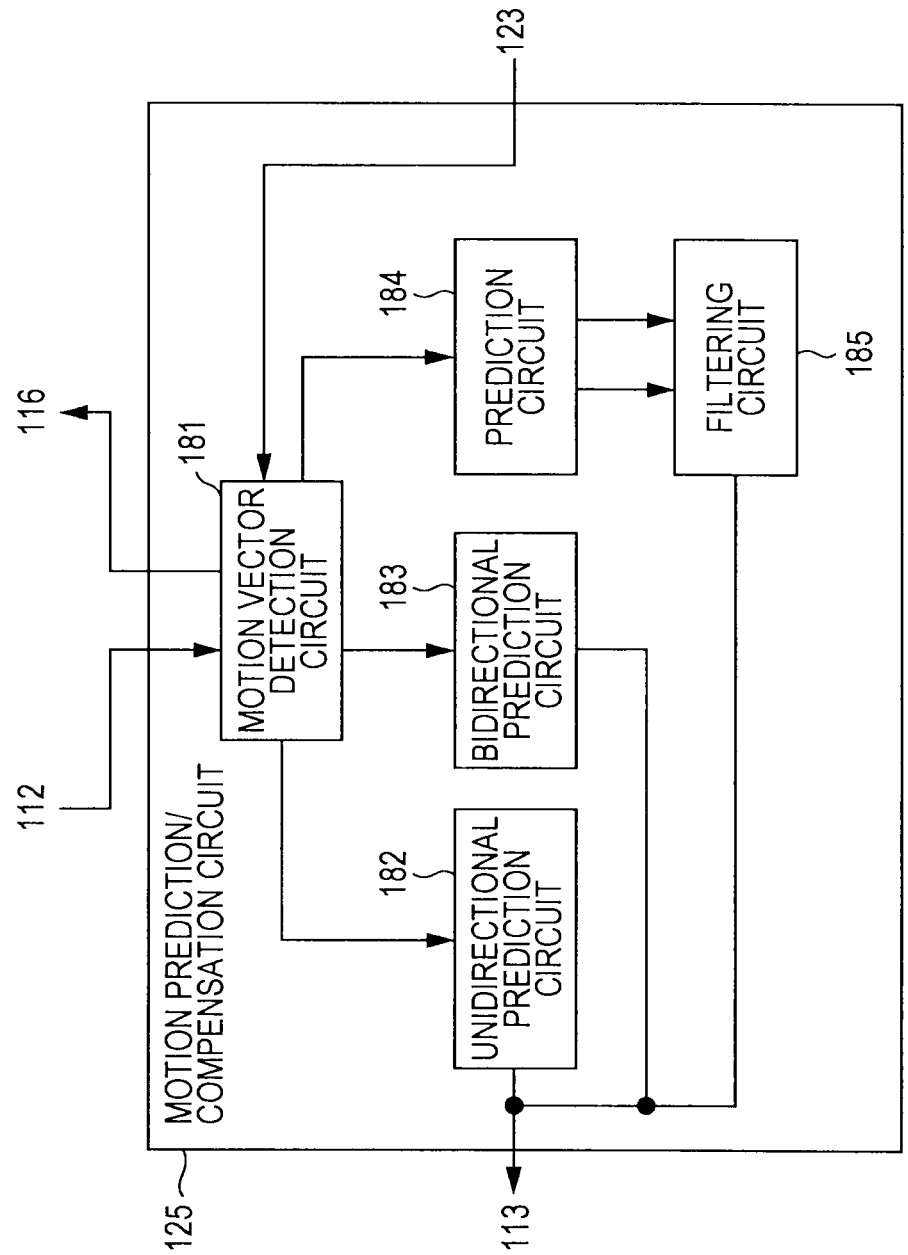
FIG. 13 is a block diagram illustrating an example configuration of a motion prediction/compensation circuit in FIG. 11.

FIG. 13 is a block diagram illustrating an example configuration of the motion prediction/compensation circuit 125 in FIG. 11.

As illustrated in FIG. 13, the motion prediction/compensation circuit 125 is composed of a motion vector detection circuit 181, a unidirectional prediction circuit 182, a bidirectional prediction circuit 183, a prediction circuit 184, and a filtering circuit 185. The motion prediction/compensation circuit 125 has a configuration similar to that of the motion prediction/compensation circuit 21 illustrated in FIG. 5, except that the motion vector detection circuit 181 is provided in place of the prediction mode determination circuit 41.

The motion vector detection circuit 181 detects a motion vector by performing block matching or the like on the basis of the original image supplied from the rearrangement buffer 112 and a reference frame supplied from the mode determination circuit 123. The motion vector detection circuit 181 refers to the mode information supplied from the mode determination circuit 123, and outputs the motion vector, together with the reference frame, to one of the unidirectional prediction circuit 182, the bidirectional prediction circuit 183, and the prediction circuit 184.

The motion vector detection circuit 181 outputs the motion vector, together with the reference frame, to the unidirectional prediction circuit 182 in a case where it has been selected that unidirectional prediction is to be performed, and outputs these pieces of information to the bidirectional prediction circuit 183 in a case where it has been selected that bidirectional prediction is to be performed. In case where it has been selected that filtering prediction is to be performed, the motion vector detection circuit 181 outputs the motion vector, together with the reference frame, to the prediction circuit 184.

The unidirectional prediction circuit 182 generates a prediction image by, similarly to the unidirectional prediction circuit 42 in FIG. 5, performing unidirectional prediction. The unidirectional prediction circuit 182 outputs the generated prediction image to the adder circuit 113.

The bidirectional prediction circuit 183 generates a prediction image by, similarly to the bidirectional prediction circuit 43 in FIG. 5, performing bidirectional prediction. The bidirectional prediction circuit 183 outputs the generated prediction image to the adder circuit 113.

Similarly to the prediction circuit 44 in FIG. 5, the prediction circuit 184 extracts a motion compensation image from each of a plurality of reference frames such as two reference frames, and outputs the plurality of extracted motion compensation images to the filtering circuit 185.

Similarly to the filtering circuit 45 in FIG. 5, the filtering circuit 185 generates a prediction image by performing filtering prediction. The filtering circuit 185 outputs the generated prediction image to the adder circuit 113. Note that the filtering circuit 185 has a configuration similar to the configuration of the filtering circuit 45 illustrated in FIG. 8. Hereinafter, the configuration of the filtering circuit 185 will be described by referring to the configuration of the filtering circuit 45 illustrated in FIG. 8, as necessary.

A prediction image generated through filtering prediction may be an image that includes more high-frequency components than a prediction image generated through unidirectional prediction and bidirectional prediction and that has a small difference from the original image. Therefore, only a small amount of code to be assigned to a residual error is required, thus making it possible to increase encoding efficiency.

Furthermore, since filtering prediction can be performed using at least two reference frames, such an increase in encoding efficiency is made feasible without increasing the complexity of processing. The residual error from the original image can be reduced and the encoding efficiency can be increased by, for example, increasing the number of reference frames to be used for inter-prediction to generate a high-accuracy prediction image and by using it. However, in this case, the number of reference frame used increases, and the complexity of processing increases.

Note that, on the occasion of selection of a prediction method, an optimum prediction method may be selected by taking into account the amount of code of information such as motion vectors necessary for prediction and an encoding mode and by adding a weight corresponding to the amount of code to the intensity of a residual error signal. This makes it possible to further improve encoding efficiency. Furthermore, for simplicity of encoding processing, a prediction method may be adaptively selected utilizing a feature value of an input original image in the time and space directions.

Next, a process of the encoding apparatus 101 having the foregoing configuration will be described.

Figure 14:
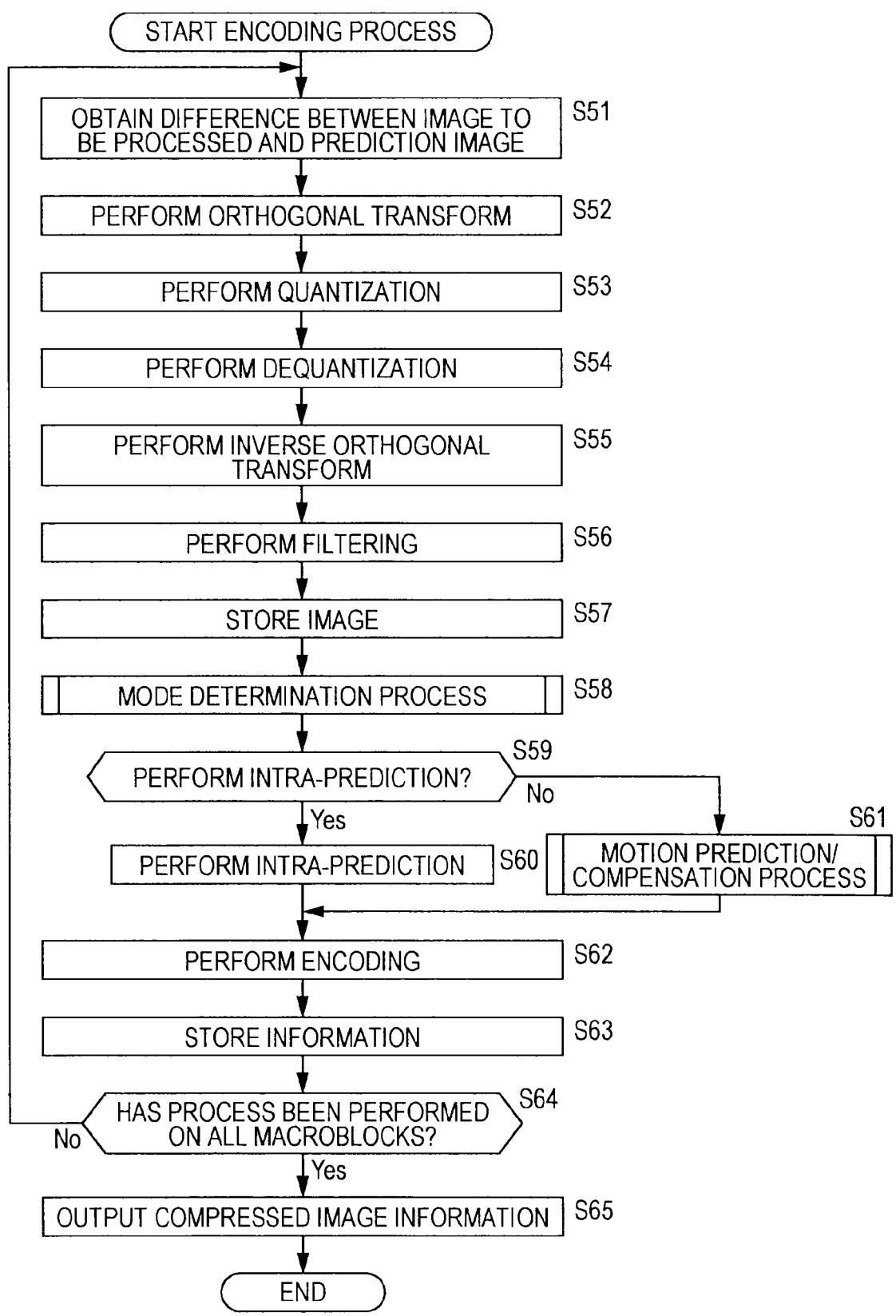
FIG. 14 is a flowchart describing an encoding process of the encoding apparatus.

An encoding process of the encoding apparatus 101 will be described with reference to a flowchart of FIG. 14. This process is started when an image of a certain unit such as a macroblock is output from the rearrangement buffer 112.

In step S51, the adder circuit 113 determines the difference between an image supplied from the rearrangement buffer 112 and a prediction image generated by the motion prediction/compensation circuit 125 or the intra-prediction circuit 126, and outputs the residual error to the orthogonal transform circuit 114.

In step S52, the orthogonal transform circuit 114 performs an orthogonal transform on the residual error supplied from the adder circuit 113, and outputs a transform coefficient to the quantization circuits 115.

In step S53, the quantization circuit 115 quantizes the transform coefficient supplied from the orthogonal transform circuit 114, and outputs the quantized transform coefficient.

In step S54, the dequantization circuit 119 performs dequantization on the transform coefficient quantized by the quantization circuit 115, and outputs the transform coefficient to the inverse orthogonal transform circuit 120.

In step S55, the inverse orthogonal transform circuit 120 performs an inverse orthogonal transform on the transform coefficient supplied from the dequantization circuit 119, and outputs an obtained image to the deblocking filter 121.

In step S56, the deblocking filter 121 removes block noise by performing filtering, and outputs an image from which the block noise has been removed to the frame memory 122.

In step S57, the frame memory 122 stores the image supplied from the deblocking filter 121.

In step S58, the mode determination circuit 123 performs a mode determination process. With the mode determination process, which prediction mode a prediction image is to be generated in is determined. The mode determination process will be described below with reference to a flowchart of FIG. 15.

In step S59, the control circuit 131 determines whether or not intra-prediction is to be performed on the basis of the determination by the mode determination circuit 123.

In a case where it is determined in step S59 that intra-prediction is to be performed, then, in step S60, the intra-prediction circuit 126 performs intra-prediction, and outputs a prediction image to the adder circuit 113.

In contrast, in a case where it is determined in step S59 that intra-prediction is not to be performed, that is, inter-prediction is to be performed, then, in step S61, a motion prediction/compensation process is performed by the motion prediction/compensation circuit 125, and a prediction image is output to the adder circuit 113. The motion prediction/compensation process will be described below with reference to a flowchart of FIG. 16.

In step S62, the lossless encoding circuit 116 compresses the transform coefficient supplied from the quantization circuit 115, and outputs it to the storage buffer 117. Furthermore, the lossless encoding circuit 116 describes an identification flag in the header of the image or describes a motion vector supplied from the motion prediction/compensation circuit 125 in the header of the image in accordance with the information supplied from the mode determination circuit 123.

In step S63, the storage buffer 117 temporarily stores the information supplied from the lossless encoding circuit 116.

In step S64, the control circuit 31 determines whether or not the foregoing process has been performed on the macroblocks in one entire frame. In a case where it is determined that the process has not been performed, the process from step S51 is repeatedly performed on another macroblock.

In contrast, in a case where it is determined in step S64 that the process has been performed on the macroblocks in one entire frame, then, in step S65, the storage buffer 117 outputs compressed image information in accordance with the control by the control circuit 131. The foregoing process is performed on each frame.

Figure 15:
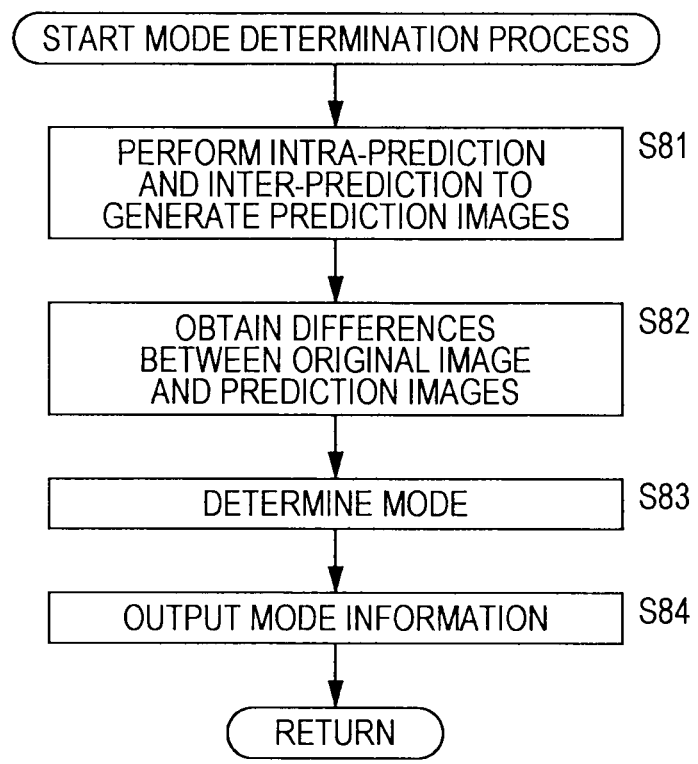
FIG. 15 is a flowchart describing a mode determination process performed in step S58 of FIG. 14.

Next, the mode determination process performed in step S58 of FIG. 14 will be described with reference to a flowchart of FIG. 15.

In step S81, the intra-prediction circuit 141 and the inter-prediction circuit 142 perform intra-prediction and inter-prediction, respectively, on blocks having different dimensions, and generate prediction images. The generated prediction images are supplied to the prediction error calculation circuit 143.

In step S82, the prediction error calculation circuit 143 determines the difference between the original image and each of the prediction images supplied from the respective circuits in the intra-prediction circuit 141, and the unidirectional prediction circuit 162, bidirectional prediction circuit 163, and filtering circuit 164 of the inter-prediction circuit 142. The prediction error calculation circuit 143 outputs a residual error signal to the determination circuit 144.

In step S83, the determination circuit 144 determines a prediction method for generating a prediction image to be supplied to the adder circuit 113 on the basis of the intensity of the residual error signal supplied from the prediction error calculation circuit 143.

In step S84, the determination circuit 144 outputs mode information that is information regarding the determined prediction method to the lossless encoding circuit 116. After that, the process returns to step S58 of FIG. 14, and the subsequent processing is performed.

Figure 16:
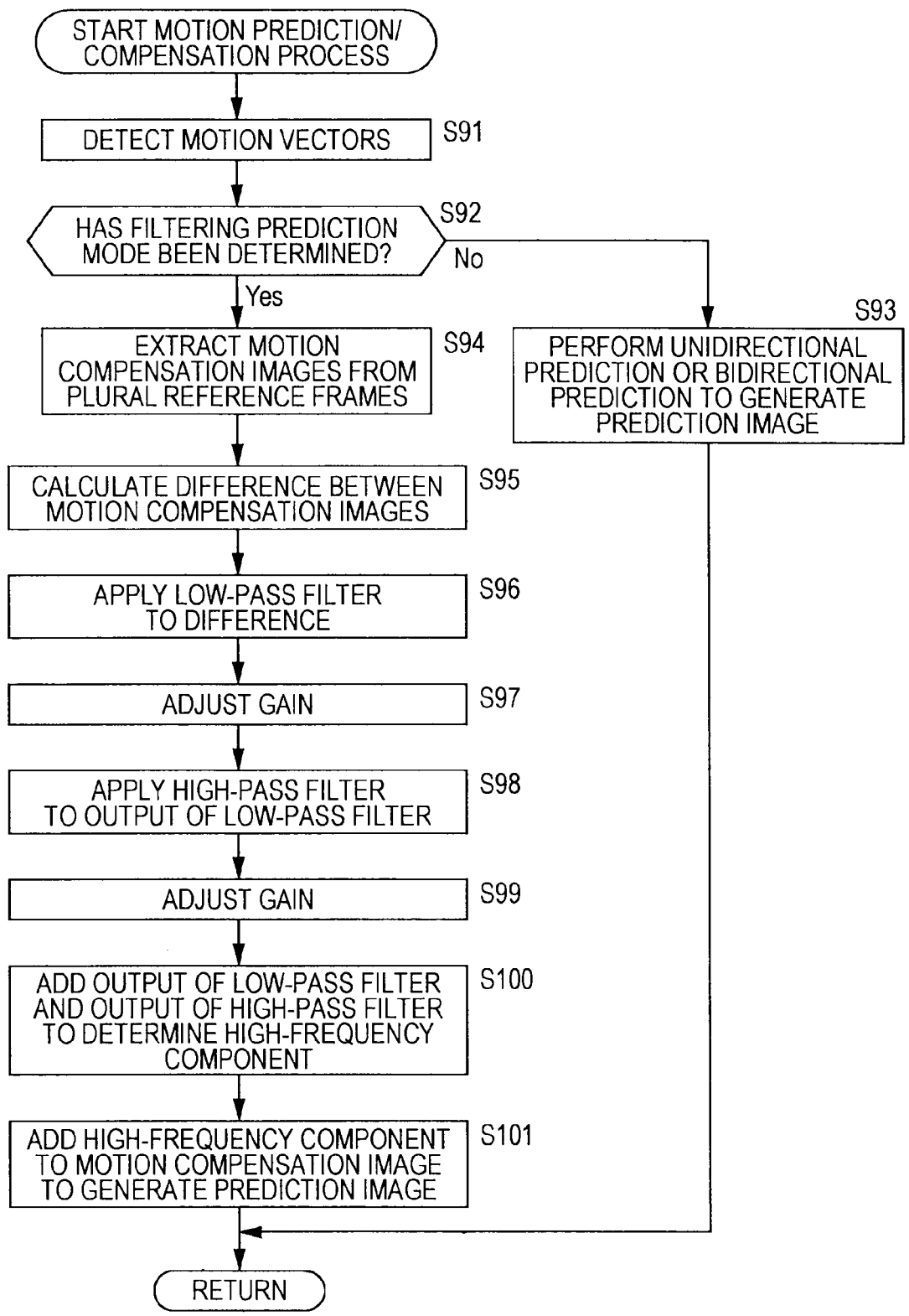
FIG. 16 is a flowchart describing a motion prediction/compensation process performed in step S61 of FIG. 14.

Next, the motion prediction/compensation process performed in step S61 of FIG. 14 will be described with reference to a flowchart of FIG. 16.

In step S91, the motion vector detection circuit 181 detects a motion vector on the basis of the original image and a reference frame.

In step S92, the motion vector detection circuit 181 determines whether or not the mode determination circuit 123 has determined that the processing is to be performed in the filtering prediction mode.

In a case where it is determined in step S92 that it has not been determined that the processing is to be performed in the filtering prediction mode, then, in step S93, unidirectional prediction or bidirectional prediction is performed, and a prediction image is generated.

That is, in a case where it has been determined that the processing is to be performed in the unidirectional prediction mode, a motion vector is supplied from the motion vector detection circuit 181 to the unidirectional prediction circuit 182, and unidirectional prediction is performed by the unidirectional prediction circuit 182. Furthermore, in a case where it has been determined that the processing is to be performed in the bidirectional prediction mode, a motion vector is supplied from the motion vector detection circuit 181 to the bidirectional prediction circuit 183, and bidirectional prediction is performed by the bidirectional prediction circuit 183. After the prediction image has been output to the adder circuit 113, the process returns to step S61 of FIG. 14, and the subsequent processing is performed.

In contrast, in a case where it is determined in step S92 that it has been determined that the processing is to be performed in the filtering prediction mode, then, in step S94, the prediction circuit 184 extracts a motion compensation image from each of a plurality of reference frames, and outputs the motion compensation images to the filtering circuit 185. The motion vectors are supplied from the motion vector detection circuit 181 to the prediction circuit 184, and motion compensation images are extracted using them.

In step S95, the difference calculation circuit 51 (FIG. 8) of the filtering circuit 185 calculates the difference between the motion compensation image $MC_0$ and the motion compensation image $MC_1$, and outputs a difference image to the low-pass filter circuit 52.

In step S96, the low-pass filter circuit 52 of the filtering circuit 185 applies a low-pass filter to the difference image supplied from the difference calculation circuit 51, and outputs an obtained image to the gain adjustment circuit 53 and the high-pass filter circuit 54.

In step S97, the gain adjustment circuit 53 of the filtering circuit 185 adjusts the gain of the difference image supplied from the low-pass filter circuit 52, and outputs an image for which the gain has been adjusted to the adder circuit 56.

In step S98, the high-pass filter circuit 54 of the filtering circuit 185 applies a high-pass filter to the difference image supplied from the low-pass filter circuit 52, and outputs an obtained image to the gain adjustment circuit 55.

In step S99, the gain adjustment circuit 55 of the filtering circuit 185 adjusts the gain of the image supplied from the high-pass filter circuit 54, and outputs an image for which the gain has been adjusted to the adder circuit 56.

In step S100, the adder circuit 56 of the filtering circuit 185 adds the image supplied from the gain adjustment circuit 53 and the image supplied from the gain adjustment circuit 55 to determine high-frequency components. The determined high-frequency components are supplied from the adder circuit 56 to the adder circuit 57.

In step S101, the adder circuit 57 of the filtering circuit 185 adds the image (high-frequency components) supplied from the adder circuit 56 to the motion compensation image $MC_0$, and outputs an obtained image to the adder circuit 113 as a prediction image. After that, the process returns to step S61 of FIG. 14, and the subsequent processing is performed.

As above, encoding is performed using a prediction image generated through filtering prediction, thus making it possible to increase encoding efficiency.

In the foregoing, the filtering circuits 45 and 185 are configured to have the configuration as illustrated in FIG. 8. However, this configuration can be changed as necessary.

Figure 17:
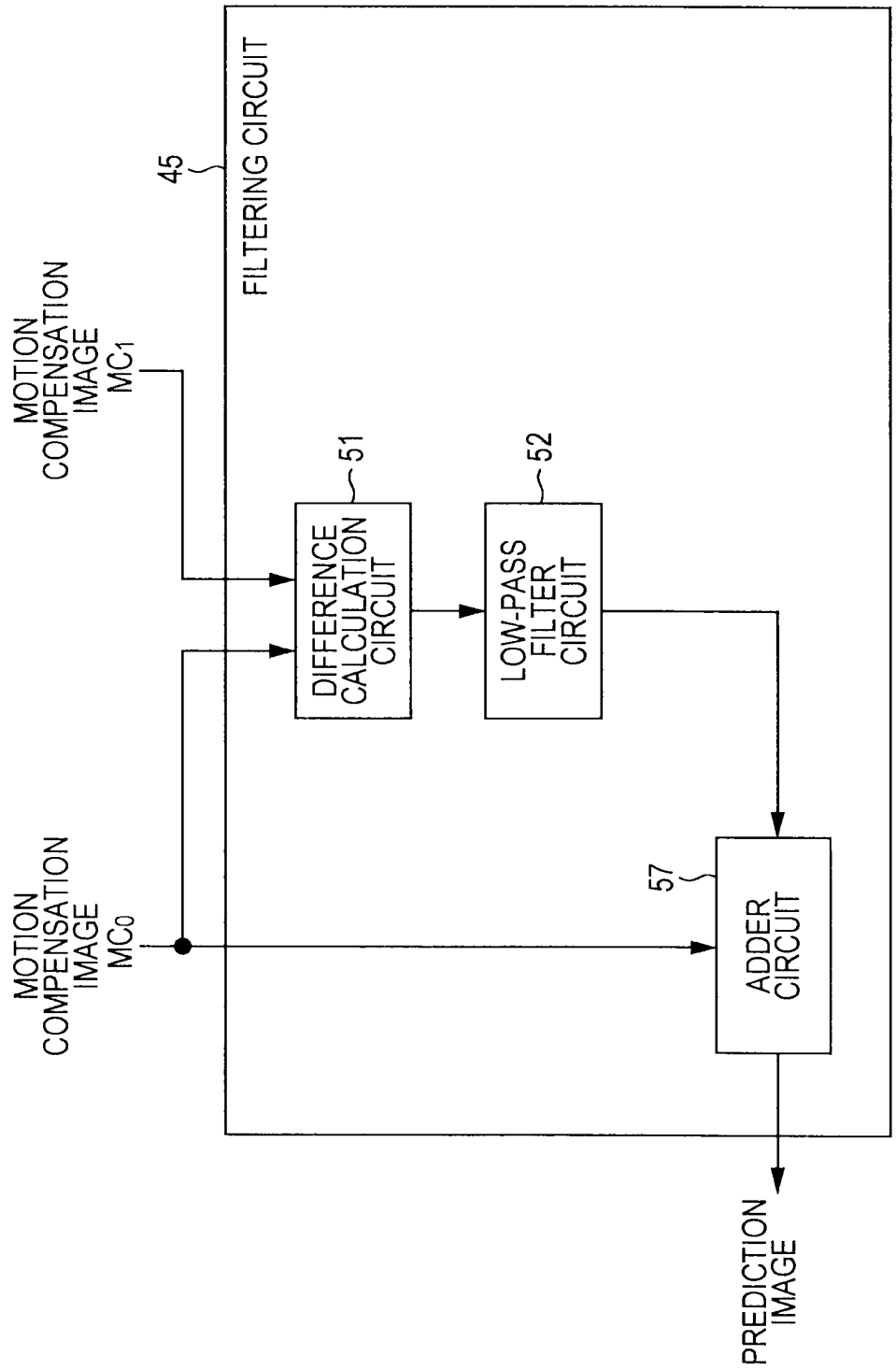
FIG. 17 is a block diagram illustrating another example configuration of the filtering circuit.

FIG. 17 is a block diagram illustrating another example configuration of the filtering circuit 45. The configuration elements corresponding to the configuration elements illustrated in FIG. 8 are assigned the same numerals. Redundant description will be omitted as appropriate.

The difference calculation circuit 51 in FIG. 17 calculates the difference between the motion compensation image $MC_0$ and the motion compensation image $MC_1$, and outputs a difference image to the low-pass filter circuit 52.

The low-pass filter circuit 52 applies a low-pass filter to the difference image supplied from the difference calculation circuit 51, and outputs an obtained image to the adder circuit 57.

The adder circuit 57 adds the image supplied from the low-pass filter circuit 52 to the motion compensation image $MC_0$, and outputs an obtained image as a prediction image.

With the use of the configuration as illustrated in FIG. 17, the amount of processing can be reduced compared to that in the case where the configuration of FIG. 8 is used, and the high-speed operation is made feasible.

Figure 18:
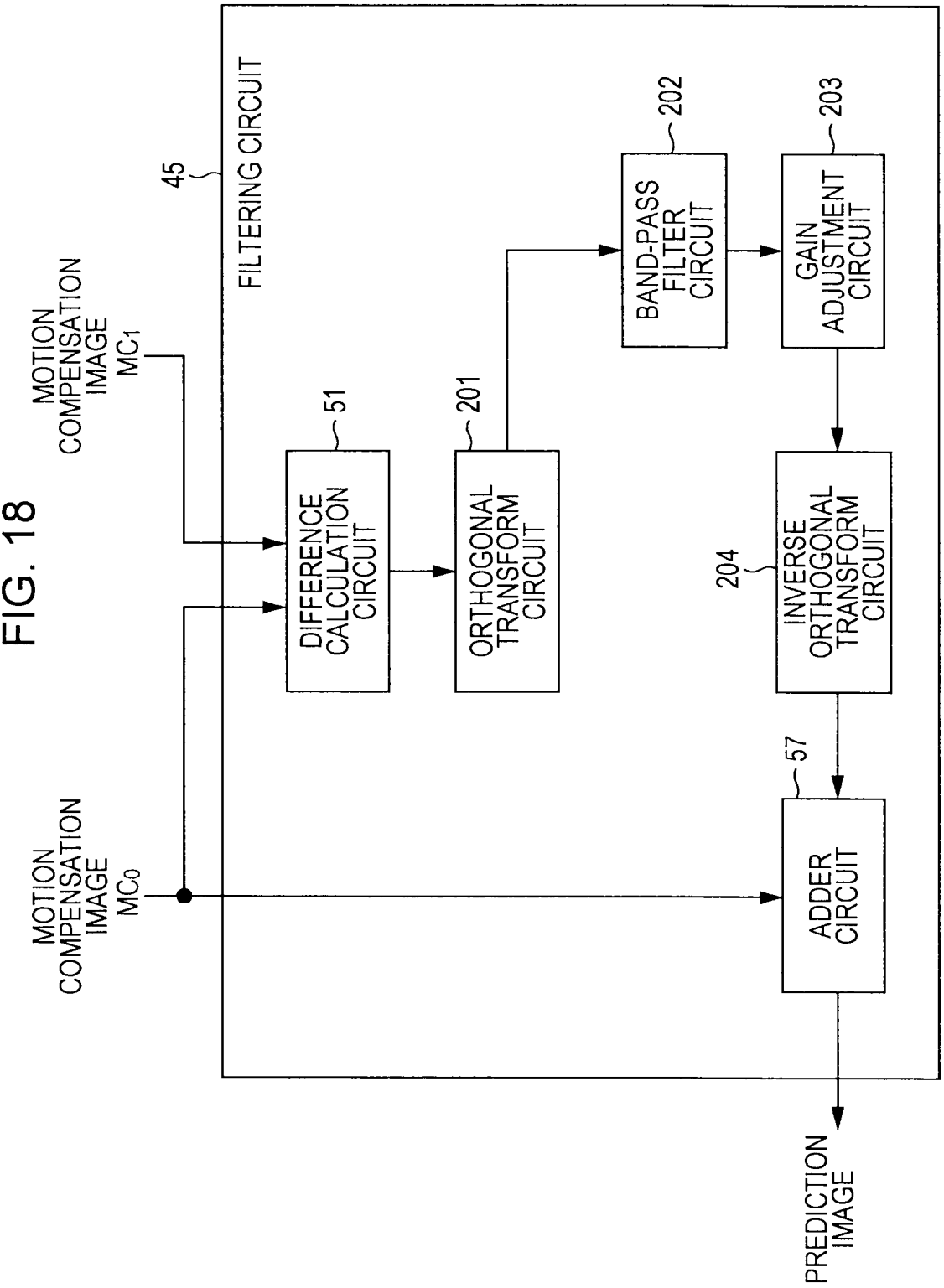
FIG. 18 is a block diagram illustrating still another example configuration of the filtering circuit.

FIG. 18 is a block diagram illustrating still another example configuration of the filtering circuit 45. The configuration elements corresponding to the configuration elements illustrated in FIG. 8 are assigned the same numerals. Redundant description will be omitted as appropriate.

In the filtering circuit 45 in FIG. 18, filtering is performed not on a signal in the time domain but on a signal in the frequency domain. Both the filtering circuits 45 illustrated in FIGS. 8 and 17 are configured to perform filtering on a signal in the time domain.

The difference calculation circuit 51 in FIG. 18 calculates the difference between the motion compensation image $MC_0$ and the motion compensation image $MC_1$, and outputs a difference image to the orthogonal transform circuit 201.

The orthogonal transform circuit 201 performs an orthogonal transform, represented by the DCT (Discrete Cosine Transform), and Hadamard transform, KLT (Karhunen Loeve Transformation), on the difference image, and outputs a signal obtained after the orthogonal transform to a band-pass filter circuit 202. Performing an orthogonal transform and performing filtering on a signal in the frequency domain make it possible to more flexibly implement a high-accuracy filtering process than that in the case where filtering is performed on a signal in the time domain.

In a case where the DCT is used as an orthogonal transform, an output DF obtained after the orthogonal transform is represented by Equation (10) below. In Equation (10), DCT (X) represents that a two-dimensional DCT process is performed on a signal X.

[Math. 10]

$$DF = DCT(D) \tag{10}$$

The band-pass filter circuit 202 performs filtering on the output of the orthogonal transform circuit 201, and outputs a signal in a certain band.

The gain adjustment circuit 203 adjusts the gain of the output of the band-pass filter circuit 202 by multiplying it by α, and also performs frequency component adjustment. An output XF of the gain adjustment circuit 203 is represented by Equation (11) below. In Equation (11), BPF(X) represents that a band-pass filtering process is performed on a signal X.

[Math. 11]

$$XF = \alpha \cdot BPF(DF) \tag{11}$$

The inverse orthogonal transform circuit 204 performs an inverse orthogonal transform using a scheme corresponding to the orthogonal transform performed by the orthogonal transform circuit 201, and transforms a signal in the frequency domain supplied from the gain adjustment circuit 203 into a signal in the time domain. For example, in a case where the orthogonal transform circuit 201 uses the DCT as an orthogonal transform, the inverse orthogonal transform circuit 204 performs the IDCT. An output X of the inverse orthogonal transform circuit 204 is represented by Equation (12) below. In Equation (12), IDCT(X) represents that a two-dimensional IDCT process is performed on the signal X.

[Math. 12]

$$X = IDCT(XF) \tag{12}$$

The adder circuit 57 adds the signal X supplied from the inverse orthogonal transform circuit 204 to the motion compensation image $MC_0$ in the time domain, and outputs an obtained image as a prediction image. The final output of the adder circuit 57, i.e., a prediction image S(i, j), is represented by Equation (13) as follows.
[Math. 13]

$$S(i,j)=MC_0(i,j)+X(i,j) \qquad (13)$$

In this manner, even if filtering is performed on a signal in the frequency domain, a high-accuracy prediction image can be generated.

Furthermore, in the foregoing, it is assumed that filtering prediction is performed using two reference frames. However, a larger number of frames may be used as reference frames.

Figure 19:
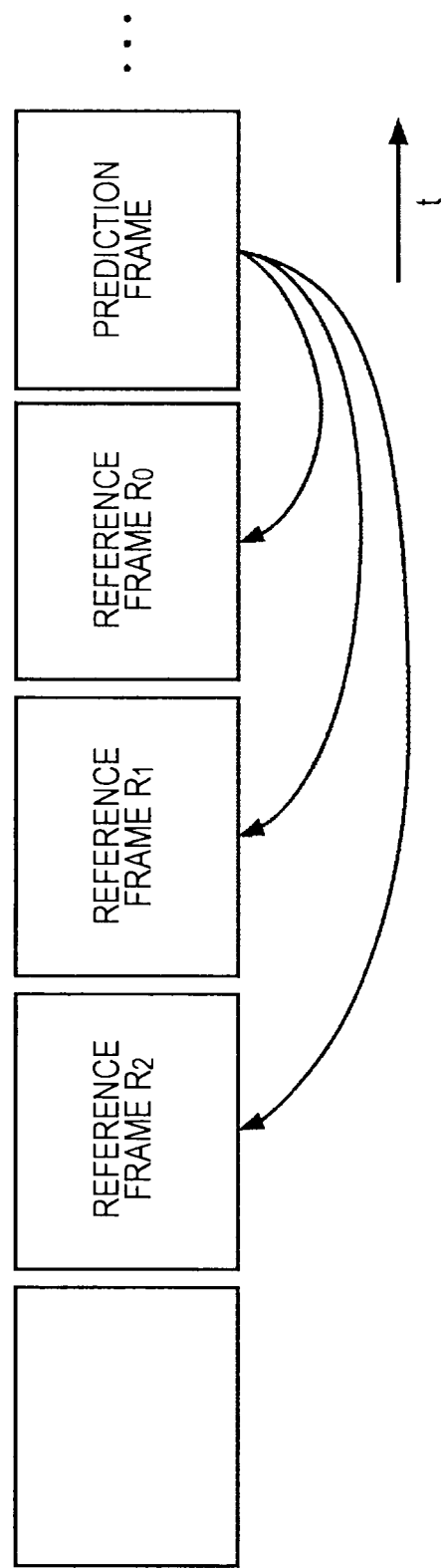
FIG. 19 is a diagram illustrating an example in a case where three reference frames are used.

FIG. 19 is a diagram illustrating an example in a case where three reference frames are used.

In the example of FIG. 19, three frames that are respectively one time point, a further one time point, and yet a further one time point previous in time to a prediction frame are set as reference frames. The one-time-point preceding frame that is closer to the prediction frame is set as a reference frame $R_0$, the frame one time point previous to the reference frame $R_0$ is set as a reference frame $R_1$, and the frame one time point previous to the reference frame $R_1$ is set as a reference frame $R_2$.

Figure 20:
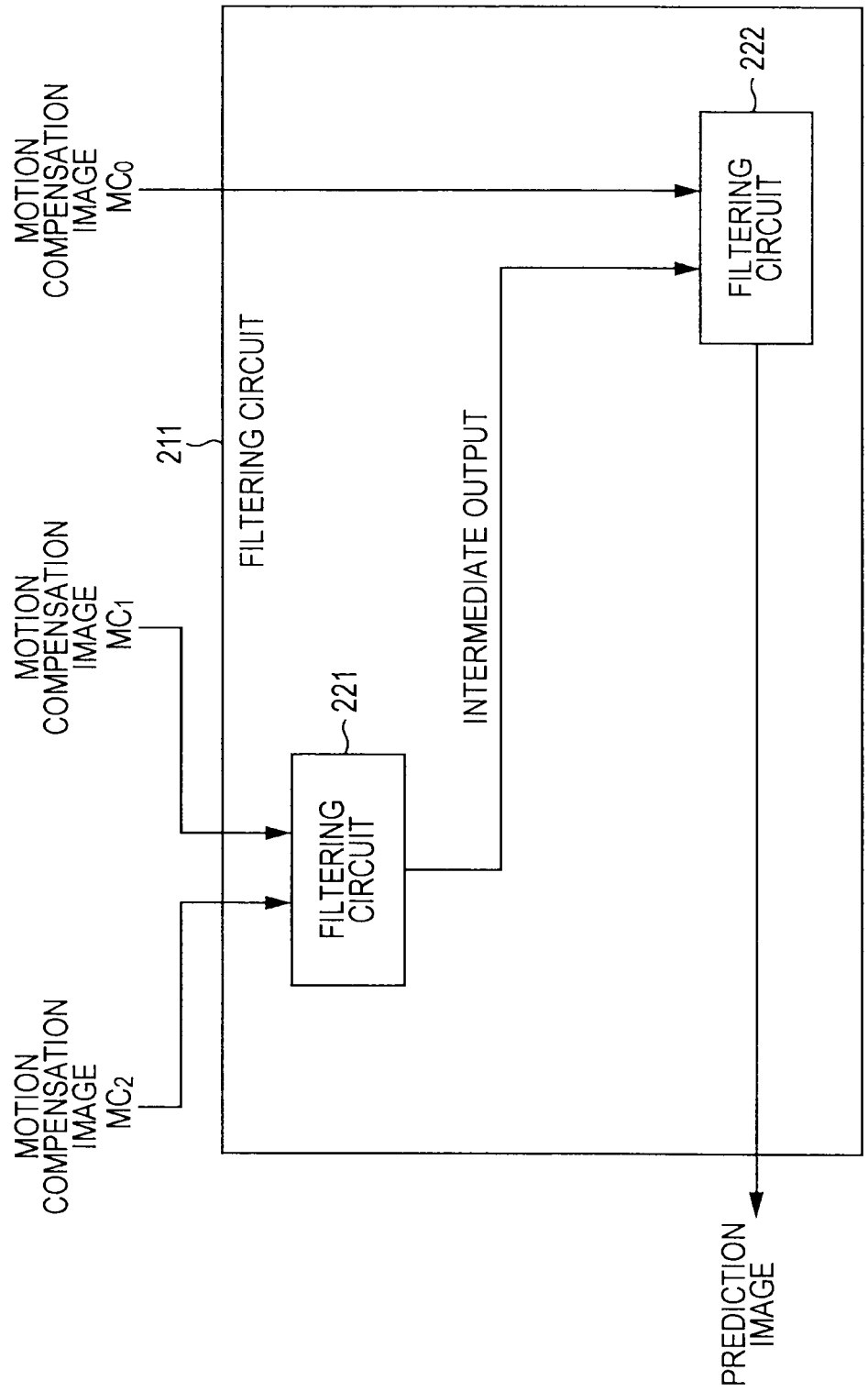
FIG. 20 is a block diagram illustrating an example configuration of a filtering circuit in a case where three reference frames are used.

FIG. 20 is a block diagram illustrating an example configuration of a filtering circuit in a case where three reference frames are used.

As illustrated in FIG. 20, a filtering circuit 211 is composed of a filtering circuit 221 and a filtering circuit 222. Each of the filtering circuit 221 and the filtering circuit 222 has the configuration as illustrated in FIG. 8, 17, or 18. That is, the filtering circuit 211 is configured to operate as a three-input and one-output circuit by connecting, in cascade, filtering circuits 45 used for the two-input and one-output design.

Here, a description will be given on the assumption that a motion compensation image extracted from the reference frame $R_0$ is a motion compensation image $MC_0$, a motion compensation image extracted from the reference frame $R_1$ is a motion compensation image $MC_1$, and a motion compensation image extracted from the reference frame $R_2$ is a motion compensation image $MC_2$. The motion compensation images $MC_1$ and $MC_2$ are input to the filtering circuit 221, and the motion compensation image $MC_0$ is input to the filtering circuit 222.

The filtering circuit 221 performs filtering using the motion compensation images $MC_1$ and $MC_2$ as the motion compensation images $MC_0$ and $MC_1$ in FIG. 8 and the like, respectively, and an intermediate output X that is the result of filtering is output to the filtering circuit 222.

The filtering circuit 221 performs filtering using the intermediate output X and the motion compensation image $MC_0$ as the motion compensation images $MC_0$ and $MC_1$ in FIG. 8 and the like, respectively, and the result of filtering is output as a prediction image.

It is also possible that the decoding apparatus 1 in FIG. 3 or the encoding apparatus 101 in FIG. 11 is provided with, in place of the filtering circuit 45, the filtering circuit 211 that handles such three reference frames.

Note that the filtering circuit 221 and the filtering circuit 222 may not necessarily have the same configuration, and may have different configurations such that one of them has the configuration illustrated in FIG. 8 and the other has the configuration illustrated in FIG. 17. Furthermore, it is also possible to make parameters used for the filters different from each other while taking into account the input/output characteristics obtained before and after filtering.

The filtering circuit 211 may perform filtering not on motion compensation images extracted from reference frames located in one temporal direction but on motion compensation images extracted from three reference frames located in the forward and backward directions.

Note that in a case where frames previous to and subsequent to a prediction frame in terms of time are used as reference frames, including the case described with reference to FIG. 7, a parameter such as a tap coefficient used for filtering may be dynamically changed in accordance with the time directions of the reference frames or the distances therebetween.

Compressed image information is transmitted from the encoding apparatus 101 to the decoding apparatus 1 via various media including recording media such as an optical disk, a magnetic disk, and a flash memory, satellite broadcasting, cable TV, the Internet, and a mobile phone network.

Figure 21:
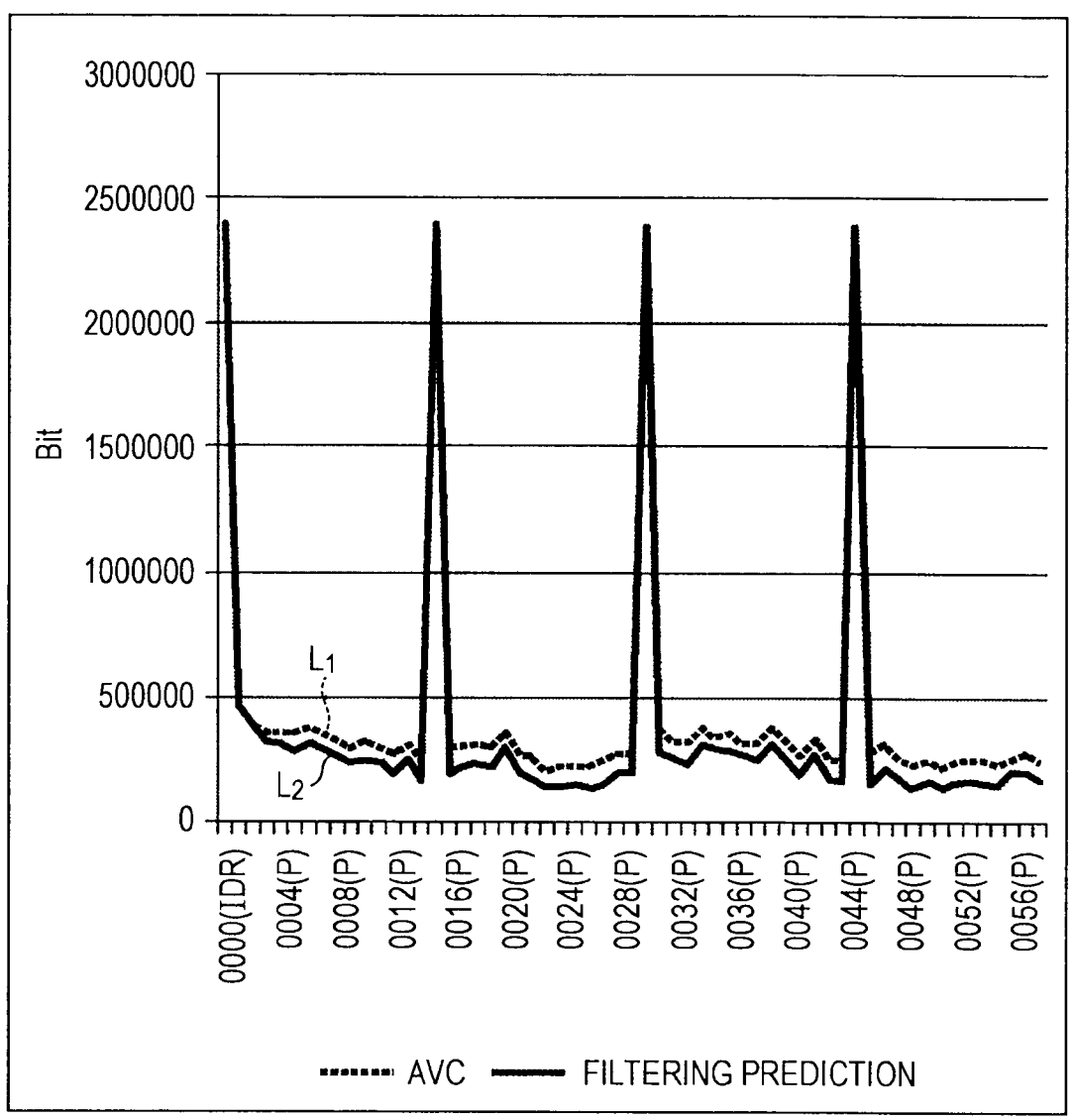
FIG. 21 is a diagram illustrating a result of encoding performed using a prediction image generated by the filtering circuit in FIG. 8.
Figure 22:
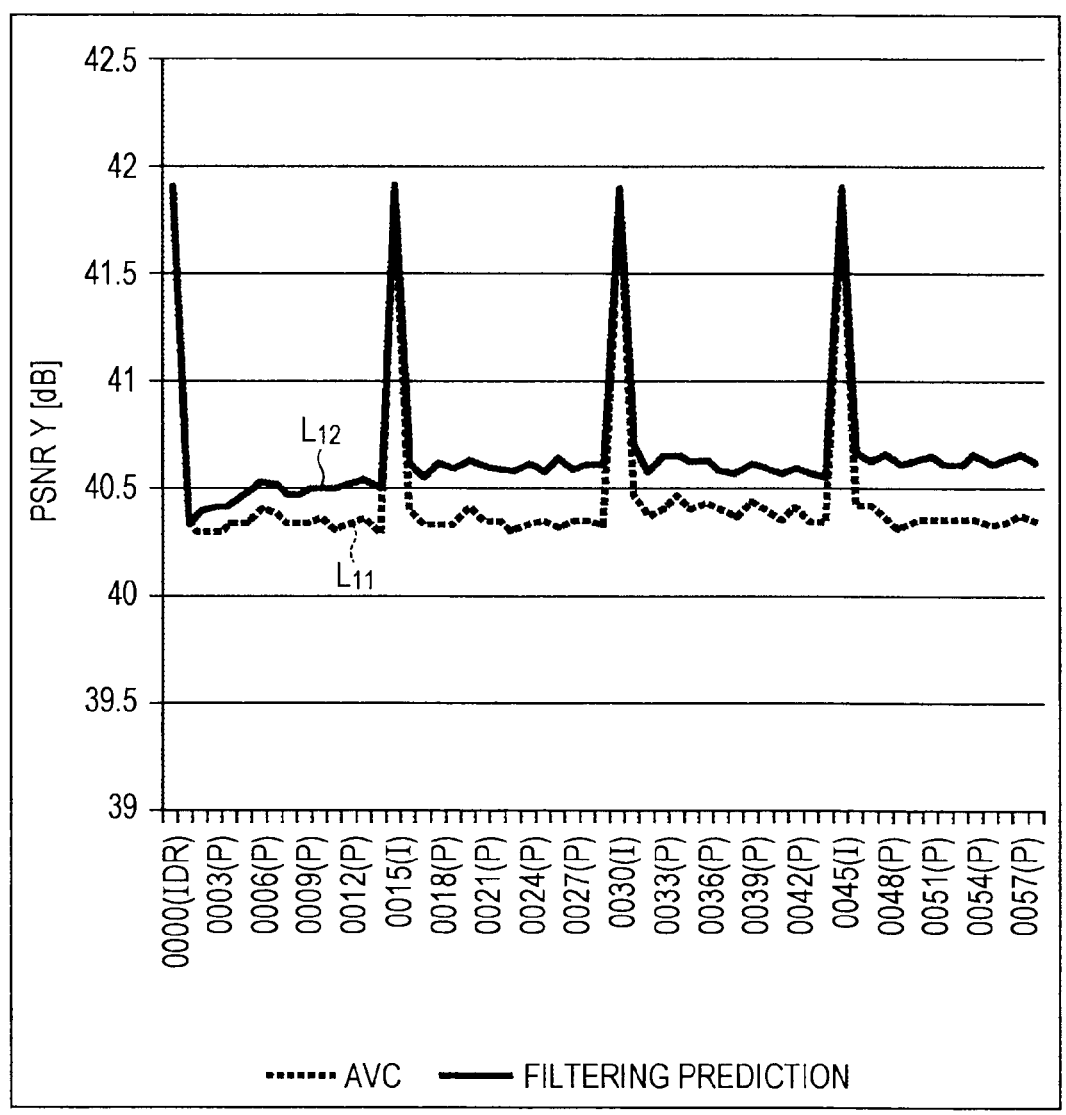
FIG. 22 is a diagram illustrating another result of encoding performed using a prediction image generated by the filtering circuit in FIG. 8.

FIGS. 21 and 22 are diagrams illustrating results obtained by performing encoding using a prediction image generated by the filtering circuit 45 in FIG. 8.

A graph of FIG. 21 illustrates the amount of encoded data produced.

In FIG. 21, the horizontal axis represents frame number. For example, "1" on the horizontal axis represents the first picture of a moving image to be subjected to processing, and "2" represents the second picture. The vertical axis represents the amount of code for each picture, whose unit is bit. It is indicated that the smaller the value, the higher the compression ratio the frame can have been compressed at.

Line $L_1$ represents the amount of code in a case where encoding is performed using existing AVC, and line $L_2$ represents the amount of code in a case where encoding is performed using filtering prediction. In this example, it is assumed that the intra-picture of one frame is inserted in every 15 frames and that the 14 frames other than the intra-picture are P-pictures.

As illustrated in FIG. 21, as for intra-pictures, since there is no difference between the case where AVC is adopted and the case where an encoding scheme using filtering prediction is adopted, the values of the amounts of code produced are the same. Furthermore, since an encoding scheme using filtering prediction requires two reference frames, the amount of code of the second P-picture for which only one, the first intra-picture can be used as a reference frame have the same value as the amount of code in the case where AVC is adopted. The amounts of code of the other P-pictures exhibit that the values for the encoding scheme using filtering prediction, which are indicated by the line $L_2$, are smaller than the values indicated by the line $L_1$.

The amount of code produced can be reduced more when an encoding scheme using filtering prediction is adopted, because the accuracy of a prediction image is higher and the amount of encoded data of a residual error can be reduced more than that in the case where AVC is adopted.

A graph of FIG. 22 illustrates the image quality of encoded data.

In FIG. 22, similarly to the horizontal axis of FIG. 21, the horizontal axis represents frame number. The vertical axis represents PSNR value. The PSNR value is an objective index indicating that the larger the value, the closer the image is to the original image (the higher the image quality), whose unit is [dB].

Line $L_{11}$ represents the PSNR value in a case where encoding is performed using existing AVC, and line $L_{12}$ represents the PSNR value in a case where encoding is performed using filtering prediction. For the same reason as that in the case of FIG. 21, the PSNR values of an intra-picture and the second P-picture also become the same both in a case where AVC is adopted and in a case where encoding is performed using filtering prediction.

In contrast, as for the other P-pictures, the PSNR values in a case where encoding scheme using filtering prediction is adopted, which are indicated by the line $L_{12}$, become larger than the PSNR values in a case where AVC is adopted, which are indicated by the line $L_{11}$.

Adopting an encoding scheme using filtering prediction provides more improvement in PSNR value, that is, image quality, because the accuracy of a prediction image can be increased.

The series of processes described above can be executed by hardware or software. In a case where the series of processes is executed software, a program constituting the software is installed from a program recording medium into a computer incorporated in dedicated hardware, or a general-purpose personal computer or the like that is capable of executing various functions by installing various programs therein.

Figure 23:
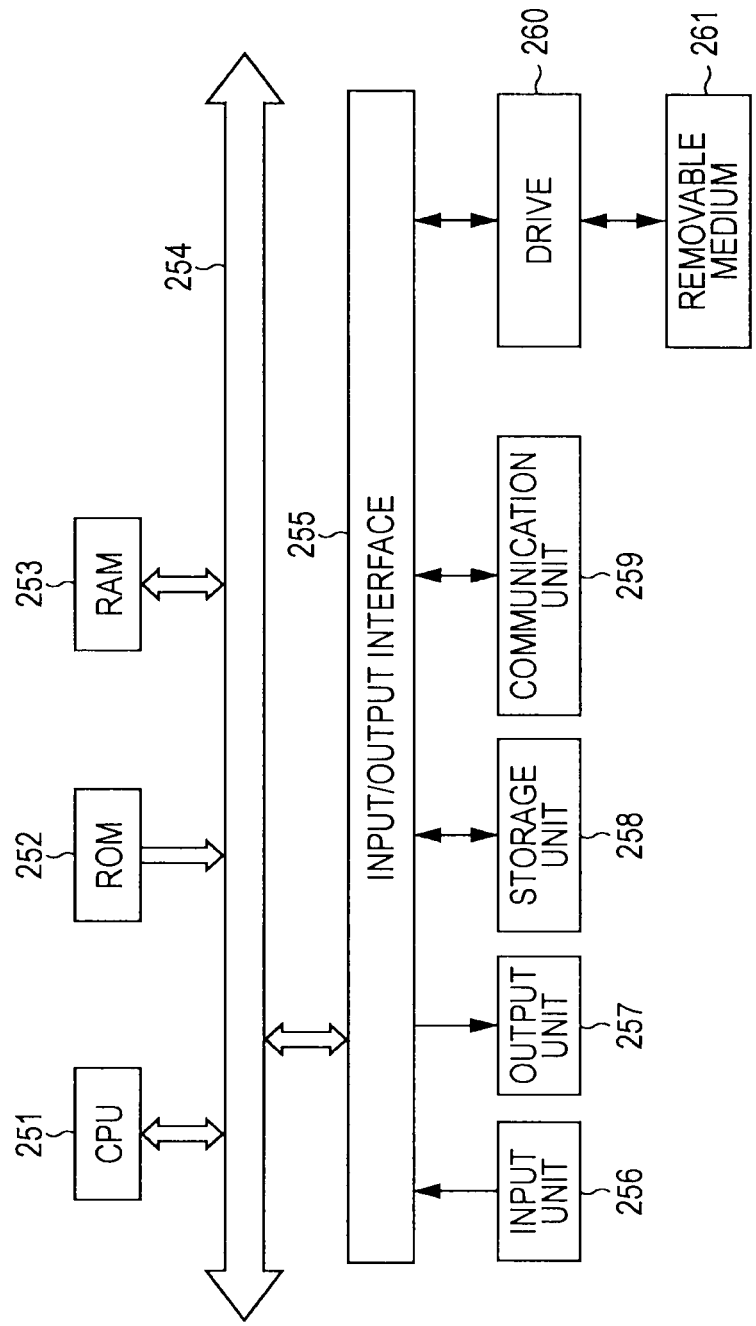
FIG. 23 is a block diagram illustrating an example configuration of a personal computer.

FIG. 23 is a block diagram illustrating an example configuration of hardware of a computer that executes the series of processes described in accordance with a program.

A CPU (Central Processing Unit) 251, a ROM (Read Only Memory) 252, and a RAM (Random Access Memory) 253 are interconnected via a bus 254.

An input/output interface 255 is further connected to the bus 254. The input/output interface 255 is connected to an input unit 256 including a keyboard, a mouse, a microphone, etc., an output unit 257 including a display, a speaker, etc., a storage unit 258 including a hard disk, a non-volatile memory, etc., a communication unit 259 including a network interface, etc., and a drive 260 that drives a removable medium 261 such as an optical disk or a semiconductor memory.

In the computer configured as above, the CPU 251 loads a program stored in, for example, the storage unit 258 into the RAM 253 via the input/output interface 255 and the bus 254 and executes the program, thereby performing the series of processes described above.

The program executed by the CPU 251 is provided by being recorded on, for example, the removable medium 261 or via a wired or wireless transmission medium such as a local area network, the Internet, or digital broadcasting, and is installed into the storage unit 258.

Note that the program executed by the computer may be a program in which processes are performed in a time-series manner in accordance with the order described herein, or may be a program in which processes are performed in parallel or at a necessary timing such as when called.

Embodiments of the present invention are not to be limited to the embodiment described above, and a variety of changes can be made without departing from the scope of the present invention.

For example, the decoding apparatus 1 or encoding apparatus 101 described above can be applied to any electronic device. Examples thereof will be described hereinafter.

Figure 24:
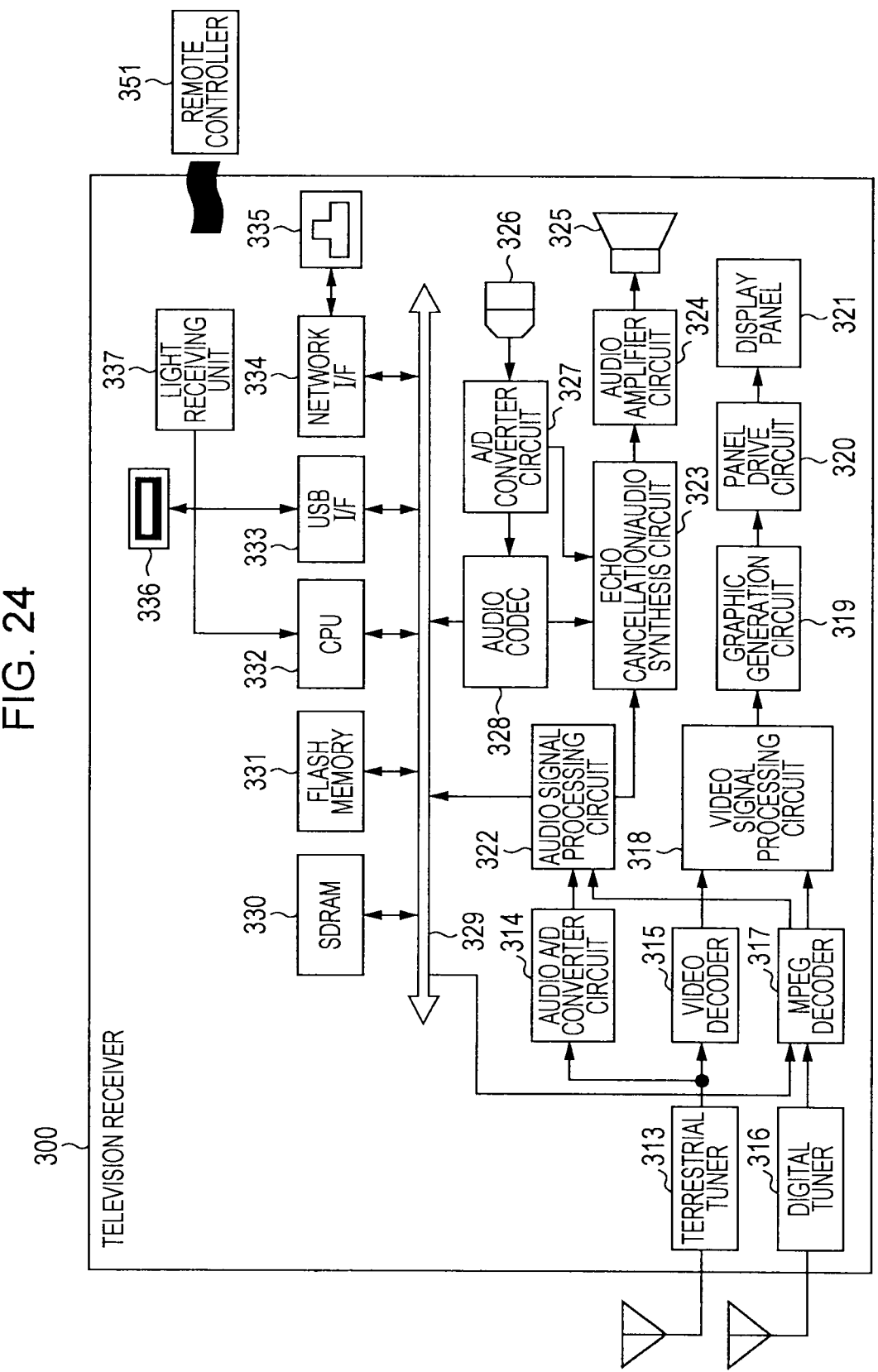
FIG. 24 is a block diagram illustrating an example configuration of a main part of a television receiver to which the present invention is applied.

FIG. 24 is a block diagram illustrating an example configuration of a main part of a television receiver that uses a decoding apparatus to which the present invention is applied.

A television receiver 300 illustrated in FIG. 24 includes a terrestrial tuner 313, a video decoder 315, a video signal processing circuit 318, a graphic generation circuit 319, a panel drive circuit 320, and a display panel 321.

The terrestrial tuner 313 receives a broadcast wave signal of a terrestrial analog broadcast via an antenna, demodulates it, obtains a video signal, and supplies it to the video decoder 315. The video decoder 315 performs a decoding process on the video signal supplied from the terrestrial tuner 313, and supplies an obtained digital component signal to the video signal processing circuit 318.

The video signal processing circuit 318 performs a certain process such as noise removal on the video data supplied from the video decoder 315, and supplies obtained video data to the graphic generation circuit 319.

The graphic generation circuit 319 generates video data of a program to be displayed on the display panel 321, image data through a process that is based on an application supplied via a network, or the like, and supplies the generated video data or image data to the panel drive circuit 320. Furthermore, the graphic generation circuit 319 also performs processes, as necessary, such as generating video data (graphic) for displaying a screen utilized by a user to select an item or the like, superimposing it onto the video data of the program to obtain video data, and supplying the obtained video data to the panel drive circuit 320.

The panel drive circuit 320 drives the display panel 321 on the basis of the data supplied from the graphic generation circuit 319, and causes video of a program or the various screens described above to be displayed on the display panel 321.

The display panel 321 is formed of an LCD (Liquid Crystal Display) or the like, and causes video of a program or the like to be displayed in accordance with the control by the panel drive circuit 320.

Furthermore, the television receiver 300 also includes an audio A/D (Analog/Digital) converter circuit 314, an audio signal processing circuit 322, an echo cancellation/audio synthesis circuit 323, an audio amplifier circuit 324, and a speaker 325.

The terrestrial tuner 313 demodulates a received broadcast wave signal to obtain a video signal as well as an audio signal. The terrestrial tuner 313 supplies the obtained audio signal to the audio A/D converter circuit 314.

The audio A/D converter circuit 314 performs an A/D conversion process on the audio signal supplied from the terrestrial tuner 313, and supplies an obtained digital audio signal to the audio signal processing circuit 322.

The audio signal processing circuit 322 performs a certain process such as noise removal on the audio data supplied from the audio A/D converter circuit 314, and supplies obtained audio data to the echo cancellation/audio synthesis circuit 323.

The echo cancellation/audio synthesis circuit 323 supplies the audio data supplied from the audio signal processing circuit 322 to the audio amplifier circuit 324.

The audio amplifier circuit 324 performs a D/A conversion process and an amplification process on the audio data supplied from the echo cancellation/audio synthesis circuit 323, and adjusts it to a certain volume before outputting audio from the speaker 325.

Further, the television receiver 300 also includes a digital tuner 316 and an MPEG decoder 317.

The digital tuner 316 receives a broadcast wave signal of a digital broadcast (terrestrial digital broadcast, BS (Broadcasting Satellite)/CS (Communications Satellite) digital broadcast) via the antenna, demodulates it, acquires an MPEG-TS (Moving Picture Experts Group-Transport Stream), and supplies it to the MPEG decoder 317.

The MPEG decoder 317 descrambles the MPEG-TS supplied from the digital tuner 316, and extracts a stream including the data of a program to be reproduced (to be viewed and listened to). The MPEG decoder 317 decodes audio packets forming the extracted stream, and supplies obtained audio data to the audio signal processing circuit 322. Also, the MPEG decoder 317 decodes video packets forming the stream, and supplies obtained video data to the video signal processing circuit 318. Furthermore, the MPEG decoder 317 supplies EPG (Electronic Program Guide) data extracted from the MPEG-TS to a CPU 332 via a path that is not illustrated in the figure.

The television receiver 300 uses the decoding apparatus 1 described above as the MPEG decoder 317 that decodes a video packet in the above way. Therefore, similarly to the case of the decoding apparatus 1, the MPEG decoder 317 performs decoding using a prediction image generated through filtering prediction. Thus, a high-definition decoded image can be obtained by more efficiently utilizing the time correlation of images.

The video data supplied from the MPEG decoder 317 is subjected to, similarly to the case of the video data supplied from the video decoder 315, a certain process by the video signal processing circuit 318, and generated video data or the like is superimposed thereon by the graphic generation circuit 319. The resulting data is supplied to the display panel 321 via the panel drive circuit 320, and an image thereof is displayed.

The audio data supplied from the MPEG decoder 317 is subjected to, similarly to the case of the audio data supplied from the audio A/D converter circuit 314, a certain process by the audio signal processing circuit 322, supplied to the audio amplifier circuit 324 via the echo cancellation/audio synthesis circuit 323, and subjected to a D/A conversion process or an amplification process. As a result, audio whose volume has been adjusted to a certain value is output from the speaker 325.

Furthermore, the television receiver 300 also includes a microphone 326 and an A/D converter circuit 327.

The A/D converter circuit 327 receives a signal of audio of a user, which is captured by the microphone 326 provided in the television receiver 300 for use in audio conversation, performs an A/D conversion process on the received audio signal, and supplies obtained digital audio data to the echo cancellation/audio synthesis circuit 323.

In a case where data of audio of a user (user A) of the television receiver 300 has been supplied from the A/D converter circuit 327, the echo cancellation/audio synthesis circuit 323 performs echo cancellation on the audio data of the user A, and causes the data of audio obtained by, for example, being combined with other audio data to be output from the speaker 325 via the audio amplifier circuit 324.

Further, the television receiver 300 also includes an audio codec 328, an internal bus 329, an SDRAM (Synchronous Dynamic Random Access Memory) 330, a flash memory 331, a CPU 332, a USB (Universal Serial Bus) I/F 333, and a network I/F 334.

The A/D converter circuit 327 receives a signal of audio of a user, which is captured by the microphone 326 provided in the television receiver 300 for use in audio conversation, performs an A/D conversion process on the received audio signal, and supplies obtained digital audio data to the audio codec 328.

The audio codec 328 converts the audio data supplied from the A/D converter circuit 327 into data of a certain format for transmission through a network, and supplies it to the network I/F 334 via the internal bus 329.

The network I/F 334 is connected to a network via a cable attached to a network terminal 335. The network I/F 334 transmits the audio data supplied from the audio codec 328 to, for example, another apparatus connected to the network. Furthermore, the network I/F 334 receives, for example, audio data transmitted from another apparatus connected over a network via the network terminal 335, and supplies it to the audio codec 328 via the internal bus 329.

The audio codec 328 converts the audio data supplied from the network I/F 334 into data of a certain format, and supplies it to the echo cancellation/audio synthesis circuit 323.

The echo cancellation/audio synthesis circuit 323 performs echo cancellation on the audio data supplied from the audio codec 328, and causes the data of audio obtained by, for example, being combined with other audio data to be output from the speaker 325 via the audio amplifier circuit 324.

The SDRAM 330 stores various data necessary for the CPU 332 to perform processes.

The flash memory 331 stores the program executed by the CPU 332. The program stored in the flash memory 331 is read by the CPU 332 at a certain timing such as when the television receiver 300 is started. The flash memory 331 also stores EPG data acquired via digital broadcasting, data acquired from a certain server via a network, and the like.

For example, the flash memory 331 stores an MPEG-TS including content data obtained from a certain server over a network under the control of the CPU 332. The flash memory 331 supplies the MPEG-TS to the MPEG decoder 317 via the internal bus 329 by, for example, the control of the CPU 332.

The MPEG decoder 317 processes the MPEG-TS in a manner similar to that in the case of the MPEG-TS supplied from the digital tuner 316. In this manner, the television receiver 300 can receive content data composed of video, audio, and the like over a network, decode the content data using the MPEG decoder 317, display the video, and output audio.

Furthermore, the television receiver 300 also includes a light receiving unit 337 that receives light an infrared signal transmitted from a remote controller 351.

The light receiving unit 337 receives infrared light from the remote controller 351, and outputs a control code indicating the content of a user operation obtained through demodulation to the CPU 332.

The CPU 332 executes a program stored in the flash memory 331, and controls the overall operation of the television receiver 300 in accordance with the control code supplied from the light receiving unit 337 or the like. The CPU 332 is connected to each unit of the television receiver 300 via a path that is not illustrated in the figure.

The USB I/F 333 transmits and receives data to and from an external device of the television receiver 300, which is connected via a USB cable attached to a USB terminal 336. The network I/F 334 is connected to a network via a cable attached to the network terminal 335, and also transmits and receives data other than audio data to and from various apparatuses connected to the network.

With the use of the decoding apparatus 1 as the MPEG decoder 317, the television receiver 300 is capable of generating a high-accuracy prediction image without increasing the process load. As a result, the television receiver 300 is capable of obtaining a higher-definition decoded image from a broadcast wave signal received via the antenna or content data obtained over a network, and displaying the image.

Figure 25:
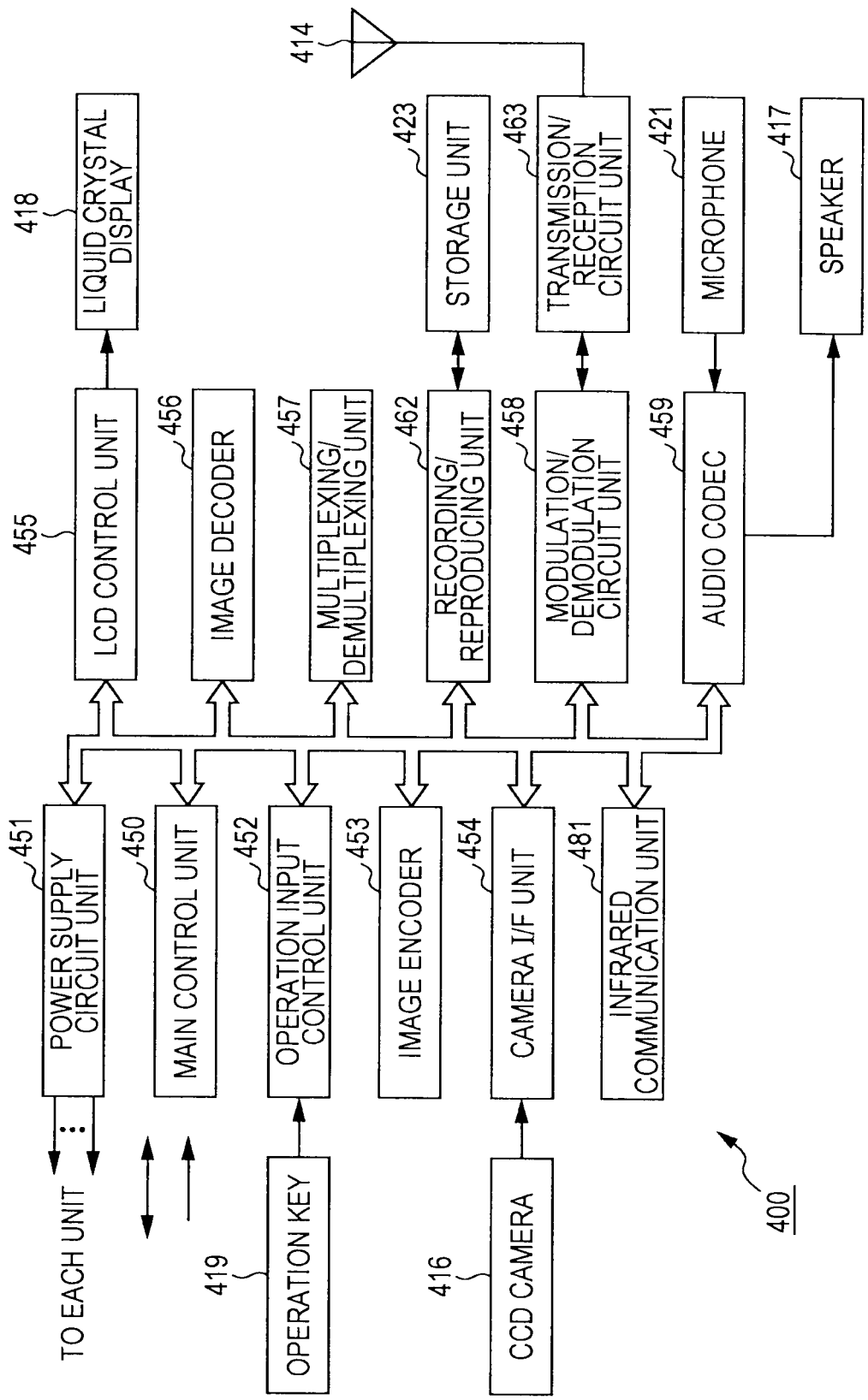
FIG. 25 is a block diagram illustrating an example configuration of a main part of a mobile phone to which the present invention is applied.

FIG. 25 is a block diagram illustrating an example configuration of a main part of a mobile phone that uses a decoding apparatus and an encoding apparatus to which the present invention is applied.

A mobile phone 400 illustrated in FIG. 25 includes a main control unit 450 configured to totally control individual units, a power supply circuit unit 451, an operation input control unit 452, an image encoder 453, a camera I/F unit 454, an LCD control unit 455, an image decoder 456, a multiplexing/demultiplexing unit 457, a recording/reproducing unit 462, a modulation/demodulation circuit unit 458, and an audio codec 459. They are interconnected via a bus 460.

Furthermore, the mobile phone 400 includes an operation key 419, a CCD (Charge Coupled Devices) camera 416, a liquid crystal display 418, a storage unit 423, a transmission/reception circuit unit 463, an antenna 414, a microphone (mic) 421, and a speaker 417.

When a call-end and power key is turned on by a user operation, the power supply circuit unit 451 supplies power to each unit from a battery pack, thereby starting the mobile phone 400 so as to be able to operate.

The mobile phone 400 performs various operations in various modes such as an audio call mode and a data communication mode, such as transmitting and receiving an audio signal, transmitting and receiving electronic mail and image data, capturing images, and recording data, on the basis of the control of the main control unit 450 composed of a CPU, a ROM, a RAM, etc.

For example, in the audio call mode, the mobile phone 400 converts, using the audio codec 459, an audio signal collected by the microphone (mic) 421 into digital audio data, performs a spread spectrum process on the digital audio data using the modulation/demodulation circuit unit 458, and performs a digital-to-analog conversion process and a frequency conversion process using the transmission/reception circuit unit 463. The mobile phone 400 transmits a transmission signal obtained through the conversion processes to a base station that is not illustrated in the figure via the antenna 414. The transmission signal (audio signal) transmitted to the base station is supplied to a mobile phone on the other end of the call via a public telephone line network.

Furthermore, for example, in the audio call mode, the mobile phone 400 amplifies, using the transmission/reception circuit unit 463, a received signal that has been received by the antenna 414, further performs a frequency conversion process and an analog-to-digital conversion process, performs an inverse spread spectrum process using the modulation/demodulation circuit unit 458, and converts the resulting signal into an analog audio signal using the audio codec 459. The mobile phone 400 outputs the analog audio signal obtained by conversion from the speaker 417.

Moreover, for example, in a case where electronic mail is transmitted in the data communication mode, the mobile phone 400 accepts, using the operation input control unit 452, text data of electronic mail input by operating the operation key 419. The mobile phone 400 processes the text data using the main control unit 450, and causes the resulting data to be displayed as an image on the liquid crystal display 418 via the LCD control unit 455.

Furthermore, the mobile phone 400 generates, using the main control unit 450, electronic mail data on the basis of the text data accepted by the operation input control unit 452, on the basis of a user instruction, or the like. The mobile phone 400 performs, using the modulation/demodulation circuit unit 458, a spread spectrum process on the electronic mail data, and performs, using the transmission/reception circuit unit 463, a digital-to-analog conversion process and a frequency conversion process. The mobile phone 400 transmits a transmission signal obtained by the conversion processes to a base station that is not illustrated in the figure via the antenna 414. The transmission signal (electronic mail) transmitted to the base station is supplied to a certain address via a network, a mail server, and the like.

Furthermore, for example, in a case where electronic mail is received in the data communication mode, the mobile phone 400 receives, using the transmission/reception circuit unit 463, a signal transmitted from a base station via the antenna 414, amplifies it, and further performs a frequency conversion process and an analog-to-digital conversion process. The mobile phone 400 performs an inverse spread spectrum process on the received signal using the modulation/demodulation circuit unit 458 to restore the original electronic mail data. The mobile phone 400 displays the restored electronic mail data on the liquid crystal display 418 via the LCD control unit 455.

Note that the mobile phone 400 is also capable of recording (storing) received electronic mail data on the storage unit 423 via the recording/reproducing unit 462.

The storage unit 423 is any rewritable storage medium. The storage unit 423 may be, for example, a semiconductor memory such as a RAM or a built-in flash memory, or may be a hard disk, or a removable medium such as a magnetic disk, a magneto-optical disk, an optical disk, a USB memory, or a memory card. Of course, any other type of medium may be used.

Further, for example, in a case where image data is transmitted in the data communication mode, the mobile phone 400 generates, using the CCD camera 416, image data by capturing an image. The CCD camera 416 includes optical devices such as a lens and an aperture, and a CCD serving as a photoelectric conversion element, captures an image of an object, converts the intensity of received light into an electrical signal, and generates image data of the image of the object. The image data is compressed and encoded by the image encoder 453 via the camera I/F unit 454 using a certain encoding scheme, for example, MPEG2, MPEG4, or the like, so as to be converted into encoded image data.

The mobile phone 400 uses the encoding apparatus 101 described above as the image encoder 453 that performs such processes. Therefore, similarly to the case of the encoding apparatus 101, the image encoder 453 performs encoding using a prediction image generated through filtering prediction, which includes a large number of high-frequency components and has a small difference from an original image. Thus, the amount of code to be assigned to a residual error can be reduced, and the encoding efficiency can be increased.

Note that, at this time, the mobile phone 400 simultaneously performs, using the audio codec 459, analog-to-digital conversion on the audio collected by the microphone (mic) 421 during the capture of an image using the CCD camera 416, and further encodes it.

The mobile phone 400 multiplexes, using the multiplexing/demultiplexing unit 457, the encoded image data supplied from the image encoder 453 and the digital audio data supplied from the audio codec 459 using a certain scheme. The mobile phone 400 performs, using the modulation/demodulation circuit unit 458, a spread spectrum process on multiplexed data obtained as a result, and performs, using the transmission/reception circuit unit 463, a digital-to-analog conversion process and a frequency conversion process. The mobile phone 400 transmits a transmission signal obtained by the conversion process to a base station that is not illustrated in the figure via the antenna 414. The transmission signal (image data) transmitted to the base station is supplied to the other end of the communication via a network or the like.

Note that in a case where no image data is to be transmitted, the mobile phone 400 may also cause image data generated using the CCD camera 416 to be displayed on the liquid crystal display 418 via the LCD control unit 455 without intervention of the image encoder 453.

Furthermore, for example, in a case where data of a moving image file having a link to a simplified homepage or the like is to be received in the data communication mode, the mobile phone 400 receives, using the transmission/reception circuit unit 463 via the antenna 414, a signal transmitted from a base station, amplifies it, and further performs a frequency conversion process and an analog-to-digital conversion process. The mobile phone 400 performs an inverse spread spectrum process on the received signal using the modulation/demodulation circuit unit 458 to restore the original multiplexed data. The mobile phone 400 demultiplexes, using the multiplexing/demultiplexing unit 457, the multiplexed data to separate it into encoded image data and audio data.

The mobile phone 400 decodes, using the image decoder 456, the encoded image data using a decoding scheme corresponding to a certain encoding scheme, such as MPEG2 or MPEG4, to generate reproduction moving image data, and causes it to be displayed on the liquid crystal display 418 via the LCD control unit 455. This allows, for example, moving image data included in a moving image file linked to the simplified homepage to be displayed on the liquid crystal display 418.

The mobile phone 400 uses the decoding apparatus 1 described above as the image decoder 456 that performs such processes. Therefore, similarly to the case of the decoding apparatus 1, the image decoder 456 performs decoding using a prediction image generated through filtering prediction. Thus, a high-definition decoded image can be obtained by more efficiently utilizing the time correlation of images.

At this time, the mobile phone 400 simultaneously converts digital audio data into an analog audio signal using the audio codec 459, and causes it to be output from the speaker 417. This allows, for example, audio data included in the moving image file linked to the simplified homepage to be reproduced.

Note that, similarly to the case of electronic mail, the mobile phone 400 may also be capable of causing received data linked to the simplified homepage to be recorded on (stored in) the storage unit 423 via the recording/reproducing unit 462.

Furthermore, the mobile phone 400 can also analyze, using the main control unit 450, a two-dimensional code obtained by the CCD camera 416 by capturing an image thereof, and acquire information recorded in the two-dimensional code.

Further, the mobile phone 400 can communicate with an external device via infrared light using an infrared communication unit 481.

With the use of the encoding apparatus 101 as the image encoder 453, the mobile phone 400 can improve the encoding efficiency for encoded data that is generated by encoding image data generated by, for example, the CCD camera 416, without improving the complexity of processing. As a result, the mobile phone 400 can provide another apparatus with high-encoding-efficiency encoded data (image data).

Furthermore, with the use of the decoding apparatus 1 as the image decoder 456, the mobile phone 400 can generate a high-accuracy prediction image without increasing the processing load. As a result, the mobile phone 400 can obtain a higher-definition decoded image from, for example, a moving image file linked to a simplified homepage and can display it.

Note that while the foregoing description has been given in the context of the mobile phone 400 which is regarded as using the CCD camera 416, the mobile phone 400 may use, in place of the CCD camera 416, an image sensor (CMOS image sensor) that uses a CMOS (Complementary Metal Oxide Semiconductor). Also in this case, similarly to the case of using the CCD camera 416, the mobile phone 400 can capture an image of an object and generate image data of the image of the object.

Furthermore, while the foregoing description has been given in the context of the mobile phone 400, the decoding apparatus 1 and the encoding apparatus 101 can be applied to, similarly to the case of the mobile phone 400, any apparatus having an image capture function or communication function similar to that of the mobile phone 400, such as, for example, a PDA (Personal Digital Assistants), a smartphone, a UMPC (Ultra Mobile Personal Computer), a netbook, or a notebook personal computer.

Figure 26:
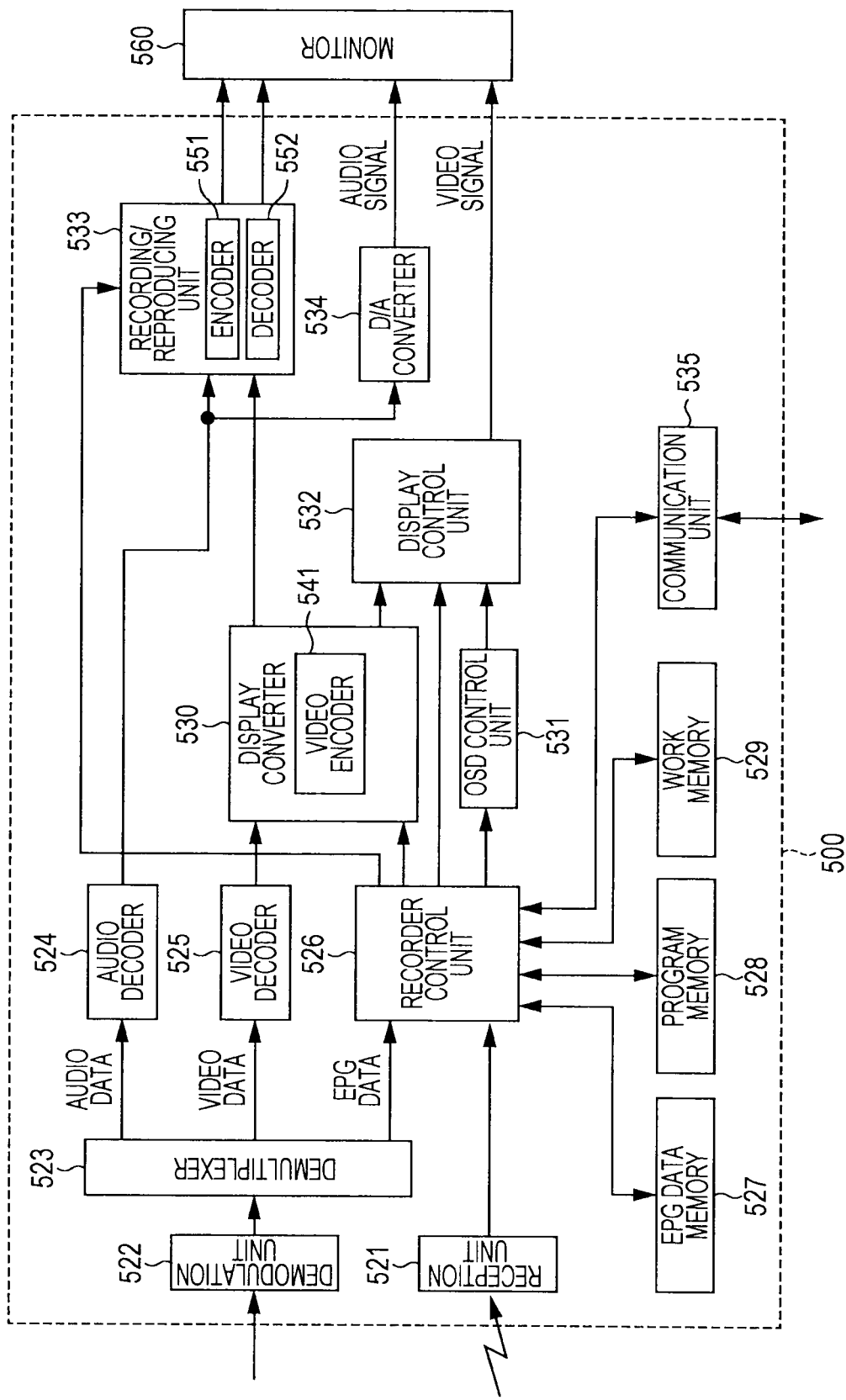
FIG. 26 is a block diagram illustrating an example configuration of a main part of a hard disk recorder to which the present invention is applied.

FIG. 26 is a block diagram illustrating an example configuration of a main part of a hard disk recorder that uses a decoding apparatus and an encoding apparatus to which the present invention is applied.

A hard disk recorder (HDD recorder) 500 illustrated in FIG. 26 is an apparatus that saves, in its built-in hard disk, audio data and video data of a broadcast program included in a broadcast wave signal (television signal) transmitted from a satellite, a terrestrial antenna, or the like, which has been received by a tuner, and that provides a user with the saved data at a timing according to a user instruction.

The hard disk recorder 500 can extract, for example, audio data and video data from a broadcast wave signal, decode them as necessary, and store them in the built-in hard disk. Furthermore, the hard disk recorder 500 can also acquire audio data or video data from another apparatus via, for example, a network, decode them as necessary, and store them in the built-in hard disk.

Further, the hard disk recorder 500 can decode audio data and video data recorded on, for example, the built-in hard disk, supply them to a monitor 560, display an image thereof on a screen of the monitor 560, and output audio thereof from a speaker of the monitor 560. Furthermore, the hard disk recorder 500 can also decode, for example, audio data and video data extracted from a broadcast wave signal acquired via a tuner or audio data and video data acquired from another apparatus via a network, supply them to the monitor 560, display an image thereof on the screen of the monitor 560, and output audio thereof from the speaker of the monitor 560.

Of course, it is also possible to perform other operations.

As illustrated in FIG. 26, the hard disk recorder 500 includes a reception unit 521, a demodulation unit 522, a demultiplexer 523, an audio decoder 524, a video decoder 525, and a recorder control unit 526. The hard disk recorder 500 further includes an EPG data memory 527, a program memory 528, a work memory 529, a display converter 530, an OSD (On Screen Display) control unit 531, a display control unit 532, a recording/reproducing unit 533, a D/A converter 534, and a communication unit 535.

Furthermore, the display converter 530 includes a video encoder 541. The recording/reproducing unit 533 includes an encoder 551 and a decoder 552.

The reception unit 521 receives an infrared signal from a remote controller (not illustrated), converts it into an electrical signal, and outputs it to the recorder control unit 526. The recorder control unit 526 is composed of, for example, a microprocessor or the like, and executes various processes in accordance with a program stored in the program memory 528. At this time, the recorder control unit 526 uses the work memory 529 in accordance with necessity.

The communication unit 535 is connected to a network, and performs a communication process with another apparatus via the network. For example, the communication unit 535 is controlled by the recorder control unit 526 to communicate with a tuner (not illustrated) and to output mainly a channel selection control signal to the tuner.

The demodulation unit 522 demodulates a signal supplied from the tuner, and outputs it to the demultiplexer 523. The demultiplexer 523 demultiplexes the data supplied from the demodulation unit 522 into audio data, video data, and EPG data, and outputs them to the audio decoder 524, the video decoder 525, and the recorder control unit 526, respectively.

The audio decoder 524 decodes the input audio data using, for example, an MPEG scheme, and outputs it to the recording/reproducing unit 533. The video decoder 525 decodes the input video data using, for example, an MPEG scheme, and outputs it to the display converter 530. The recorder control unit 526 supplies the input EPG data to the EPG data memory 527 to store the EPG data therein.

The display converter 530 encodes, using the video encoder 541, video data supplied from the video decoder 525 or the recorder control unit 526 into video data of, for example, the NTSC (National Television Standards Committee) scheme, and outputs it to the recording/reproducing unit 533. Furthermore, the display converter 530 converts the screen size of the video data supplied from the video decoder 525 or the recorder control unit 526 into the size corresponding to the size of the monitor 560, converts it into video data of the NTSC scheme using the video encoder 541, converts it into an analog signal, and outputs it to the display control unit 532.

Under the control of the recorder control unit 526, the display control unit 532 superimposes an OSD signal output from the OSD (On Screen Display) control unit 531 onto the video signal input from the display converter 530, and outputs it to the display of the monitor 560 to display it.

The audio data output from the audio decoder 524, which has been converted into an analog signal by the D/A converter 534, is also supplied to the monitor 560. The monitor 560 outputs the audio signal from its built-in speaker.

The recording/reproducing unit 533 includes a hard disk as a storage medium on which video data, audio data, and the like are recorded.

The recording/reproducing unit 533 encodes, using the encoder 551, for example, the audio data supplied from the audio decoder 524 using an MPEG scheme. Furthermore, the recording/reproducing unit 533 encodes, using the encoder 551, the video data supplied from the video encoder 541 of the display converter 530 using an MPEG scheme. The recording/reproducing unit 533 combines the encoded data of the audio data and the encoded data of the video data using a multiplexer. The recording/reproducing unit 533 performs channel coding on resulting composite data, amplifies it, and writes the data to the hard disk via a recording head.

The recording/reproducing unit 533 reproduces the data recorded on the hard disk via a reproduction head, amplifies it, and separates it into audio data and video data using a demultiplexer. The recording/reproducing unit 533 decodes, using the decoder 552, the audio data and the video data using an MPEG scheme. The recording/reproducing unit 533 performs D/A conversion on the decoded audio data, and outputs it to the speaker of the monitor 560. Furthermore, the recording/reproducing unit 533 performs D/A conversion on the decoded video data, and outputs it to the display of the monitor 560.

The recorder control unit 526 reads the latest EPG data from the EPG data memory 527 on the basis of a user instruction that is received via the reception unit 521 and that is indicated by the infrared signal from the remote controller, and supplies the EPG data to the OSD control unit 531. The OSD control unit 531 produces image data corresponding to the input EPG data, and outputs it to the display control unit 532. The display control unit 532 outputs the video data input from the OSD control unit 531 to the display of the monitor 560 to display it. This allows an EPG (electronic program guide) to be displayed on the display of the monitor 560.

Furthermore, the hard disk recorder 500 can also acquire various data such as video data, audio data, or EPG data supplied from another apparatus via a network such as the Internet.

The communication unit 535 is controlled by the recorder control unit 526 to acquire encoded data such as video data, audio data, and EPG data transmitted from another apparatus via a network, and supplies it to the recorder control unit 526. The recorder control unit 526 supplies, for example, encoded data of the acquired video data and audio data to the recording/reproducing unit 533 to store it in a hard disk. At this time, the recorder control unit 526 and the recording/reproducing unit 533 may perform a process such as re-encoding in accordance with necessity.

Furthermore, the recorder control unit 526 decodes encoded data of the acquired video data and audio data, and supplies obtained video data to the display converter 530. The display converter 530 processes the video data supplied from the recorder control unit 526 in a manner similar to that of the video data supplied from the video decoder 525, and supplies it to the monitor 560 via the display control unit 532 to display an image thereof.

Furthermore, along with the display of the image, the recorder control unit 526 may supply decoded audio data to the monitor 560 via the D/A converter 534 and output audio thereof from the speaker.

Further, the recorder control unit 526 decodes encoded data of the acquired EPG data, and supplies the decoded EPG data to the EPG data memory 527.

The hard disk recorder 500 as above uses the decoding apparatus 1 as each of decoders built in the video decoder 525, the decoder 552, and the recorder control unit 526. Therefore, similarly to the case of the decoding apparatus 1, the decoders built in the video decoder 525, the decoder 552, and the recorder control unit 526 perform decoding using a prediction image generated through filtering prediction. Thus, a high-definition decoded image can be obtained by more efficiently utilizing the time correlation of images.

Therefore, the hard disk recorder 500 can generate a high-accuracy prediction image without increasing the processing load. As a result, the hard disk recorder 500 can obtain a higher-definition decoded image from, for example, encoded data of video data received via a tuner, encoded data of video data read from the hard disk of the recording/reproducing unit 533, or encoded data of video data acquired via a network, and display the image on the monitor 560.

Furthermore, the hard disk recorder 500 uses the encoding apparatus 101 as the encoder 551. Therefore, similarly to the case of the encoding apparatus 101, the encoder 551 performs encoding using a prediction image generated through filtering prediction, which includes a large number of high-frequency components and has a small difference from the original image. Thus, the amount of code to be assigned to a residual error can be reduced, and encoding efficiency can be increased.

Therefore, the hard disk recorder 500 can improve the encoding efficiency of, for example, encoded data to be recorded on the hard disk without increasing the complexity of processing. As a result, the hard disk recorder 500 can more efficiently use the storage area of the hard disk.

Note that while the foregoing description has been given in the context of the hard disk recorder 500 that records video data and audio data on a hard disk, of course, any type of recording medium may be used. For example, even a recorder that uses a recording medium other than a hard disk, such as a flash memory, an optical disk, or a videotape, can also use the decoding apparatus 1 and the encoding apparatus 101 in a manner similar to that in the case of the hard disk recorder 500 described above.

Figure 27:
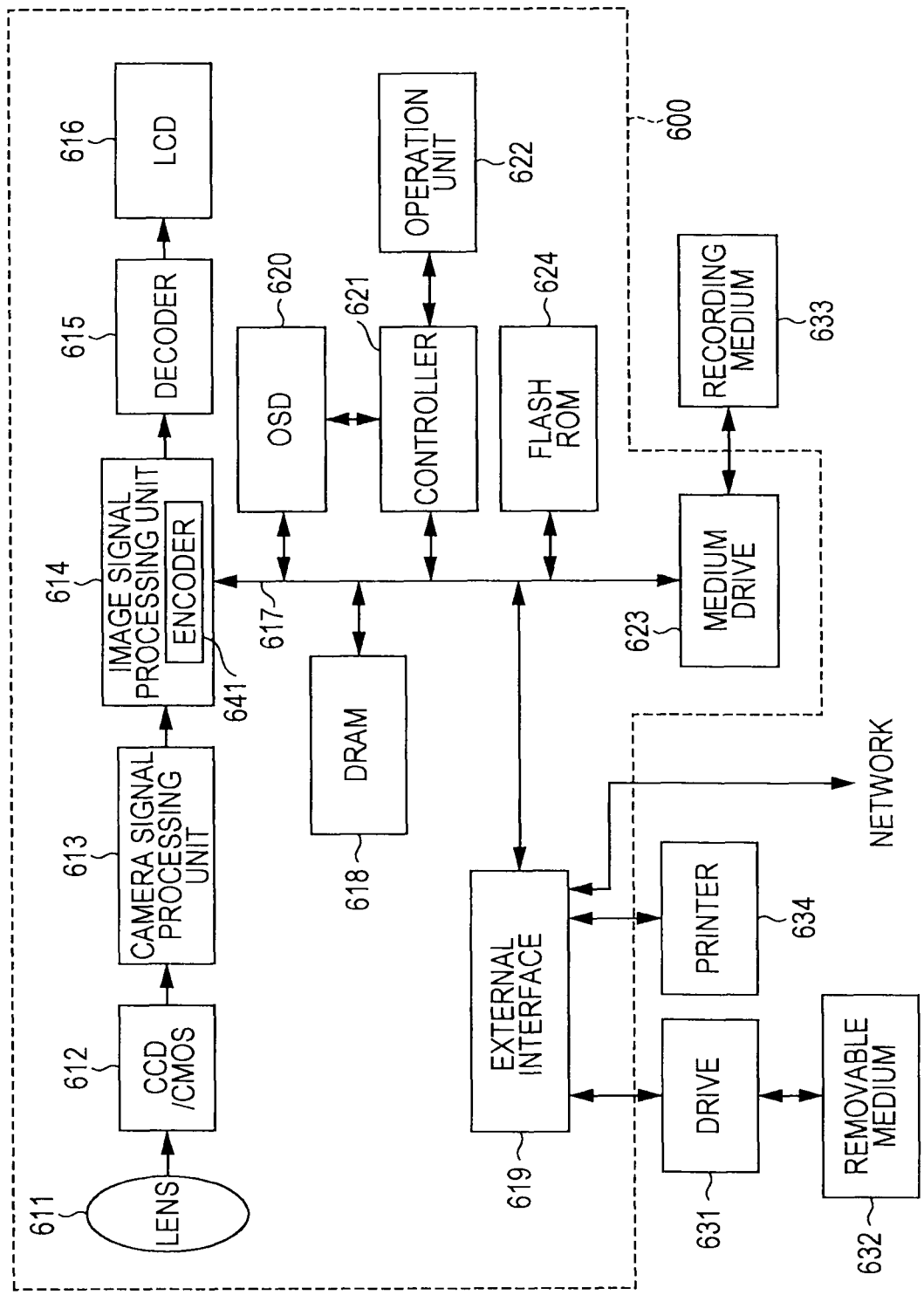
FIG. 27 is a block diagram illustrating an example configuration of a main part of a camera to which the present invention is applied.

FIG. 27 is a block diagram illustrating an example configuration of a main part of a camera that uses a decoding apparatus and an encoding apparatus to which the present invention is applied.

A camera 600 illustrated in FIG. 27 captures an image of an object, and causes the image of the object to be displayed on an LCD 616 or records it on a recording medium 633 as image data.

A lens block 611 causes light (that is, video of an object) to be incident on a CCD/CMOS 612. The CCD/CMOS 612 is an image sensor that uses a CCD or a CMOS, converts the intensity of received light into an electrical signal, and supplies it to a camera signal processing unit 613.

The camera signal processing unit 613 converts the electrical signal supplied from the CCD/CMOS 612 into Y, Cr, and Cb color difference signals, and supplies them to an image signal processing unit 614. Under the control of a controller 621, the image signal processing unit 614 performs certain image processing on the image signal supplied from the camera signal processing unit 613 or encodes, using an encoder 641, the image signal using, for example, an MPEG scheme. The image signal processing unit 614 supplies encoded data generated by encoding the image signal to the decoder 615. Further, the image signal processing unit 614 acquires display data generated by an on-screen display (OSD) 620, and supplies it to a decoder 615.

In the foregoing processes, the camera signal processing unit 613 utilizes a DRAM (Dynamic Random Access Memory) 618 connected via a bus 617, and causes image data, encoded data obtained by encoding the image data, or the like to be held in the DRAM 618 in accordance with necessity.

The decoder 615 decodes the encoded data supplied from the image signal processing unit 614, and supplies obtained image data (decoded image data) to the LCD 616. Furthermore, the decoder 615 supplies the display data supplied from the image signal processing unit 614 to the LCD 616. The LCD 616 combines the image of the decoded image data supplied from the decoder 615 and the image of the display data, as necessary, and displays a resulting composite image.

Under the control of the controller 621, the on-screen display 620 outputs display data such as a menu screen formed of signs, characters, or figures, and an icon to the image signal processing unit 614 via the bus 617.

The controller 621 executes various processes on the basis of a signal indicating the content of a command issued by a user using an operation unit 622, and also controls the image signal processing unit 614, the DRAM 618, an external interface 619, the on-screen display 620, a medium drive 623, and the like via the bus 617. A FLASH ROM 624 stores programs, data, and the like necessary for the controller 621 to execute various processes.

For example, the controller 621 can encode image data stored in the DRAM 618 or decode encoded data stored in the DRAM 618 on behalf of the image signal processing unit 614 or the decoder 615. At this time, the controller 621 may perform an encoding or decoding process using a scheme similar to the encoding or decoding scheme of the image signal processing unit 614 or the decoder 615, or may perform an encoding or decoding process using a scheme that is not supported by the image signal processing unit 614 or the decoder 615.

Furthermore, for example, in a case where an instruction for starting printing an image has been issued from the operation unit 622, the controller 621 reads image data from the DRAM 618, and supplies it to a printer 634 connected to the external interface 619 via the bus 617 to print it.

Further, for example, in a case where an instruction for recording an image has been issued from the operation unit 622, the controller 621 reads encoded data from the DRAM 618, and supplies it to the recording medium 633 attached to the medium drive 623 via the bus 617 to store it.

The recording medium 633 is, for example, any readable and rewritable removable medium such as a magnetic disk, a magneto-optical disk, an optical disk, or a semiconductor memory. The recording medium 633 may also be, of course, any type of removable medium, and may be a tape device, a disk, or a memory card. Of course, a non-contact IC card or the like may also be used.

Furthermore, the medium drive 623 and the recording medium 633 may also be integrally formed into, for example, a non-portable storage medium such as a built-in hard disk drive or an SSD (Solid State Drive).

The external interface 619 is composed of, for example, a USB input/output terminal or the like, and is connected to the printer 634 in a case where an image is to be printed. Furthermore, a drive 631 is connected to the external interface 619 in accordance with necessity, and a removable medium 632 such as a magnetic disk, an optical disk, or a magneto-optical disk is attached as necessary, so that a computer program read therefrom is installed into the FLASH ROM 624 in accordance with necessity.

Further, the external interface 619 includes a network interface that is connected to a certain network such as a LAN or the Internet. The controller 621 can read encoded data from the DRAM 618 in accordance with an instruction from, for example, the operation unit 622, and supply it to another apparatus connected via a network from the external interface 619. Furthermore, the controller 621 can acquire, via the external interface 619, encoded data or image data supplied from another apparatus via a network, and hold it in the DRAM 618 or supply it to the image signal processing unit 614.

The camera 600 as above uses the decoding apparatus 1 as the decoder 615. Therefore, similarly to the case of the decoding apparatus 1, the decoder 615 performs decoding using a prediction image generated through filtering prediction. Thus, a high-definition decoded image can be obtained by more efficiently utilizing the time correlation of images.

Therefore, the camera 600 can generate a high-accuracy prediction image without increasing the processing load. As a result, the camera 600 can obtain a higher-definition decoded image from, for example, image data generated using the CCD/CMOS 612, encoded data of video data read from the DRAM 618 or the recording medium 633, or encoded data of video data acquired via a network, and can display it on the LCD 616.

Furthermore, the camera 600 uses the encoding apparatus 101 as the encoder 641. Therefore, similarly to the case of the encoding apparatus 101, the encoder 641 performs encoding using a prediction image generated through filtering prediction, which includes a large number of high-frequency components and has a small difference from the original image. Thus, the amount of code to be assigned to a residual error can be reduced, and the encoding efficiency can be increased.

Therefore, the camera 600 can improve the encoding efficiency of, for example, encoded data to be recorded on a hard disk without increasing the complexity of processing. As a result, the camera 600 can more efficiently use the storage area of the DRAM 618 or the recording medium 633.

Note that a decoding method of the decoding apparatus 1 may be applied to a decoding process performed by the controller 621. Similarly, an encoding method of the encoding apparatus 101 may be applied to an encoding process performed by the controller 621.

Furthermore, image data captured by the camera 600 may be that of a moving image or a still image.

Of course, the decoding apparatus 1 and the encoding apparatus 101 can also be applied to an apparatus or a system other than the apparatuses described above.

REFERENCE SIGNS LIST 1 decoding apparatus, 21 motion prediction/compensation circuit, 41 prediction mode determination circuit, 42 unidirectional prediction circuit, 43 bidirectional prediction circuit, 44 prediction circuit, 45 filtering circuit 45, 51 difference calculation circuit, 52 low-pass filter circuit, 53 gain adjustment circuit, 54 high-pass filter circuit 54, 55 gain adjustment circuit, 56 adder circuit, 57 adder circuit Then invention claimed is:

1. An image processing apparatus comprising:
motion compensation circuitry that performs motion compensation using, as reference frames, a plurality of frames formed of images obtained by decoding encoded images and using motion vectors included in the encoded images, to generate a plurality of motion compensation images for generation of a prediction image from different reference frames, the generated prediction image being any one of a first prediction image, a second prediction image, and a third prediction image,
wherein the motion compensation circuitry includes:
prediction circuitry that generates the plurality of motion compensation images;
first filtering circuitry that applies a low-pass filter to a difference image between the plurality of motion compensation images generated by the prediction circuitry;
second filtering circuitry that applies a high-pass filter to an image obtained by the first filtering circuitry by the application of the low-pass filter; and
prediction image generating circuitry that generates the first prediction image by adding the image obtained by the first filtering circuitry by the application of the low-pass filter and an image obtained by the second filtering circuitry by the application of the high-pass filter to one of the plurality of motion compensation images generated by the prediction circuitry.

2. The image processing apparatus according to claim 1, further comprising decoding circuitry that decodes the encoded images to send the motion vectors to the motion compensation circuitry.

3. The image processing apparatus according to claim 2, wherein the motion compensation circuitry selects, as the reference frames, a frame that is one frame previous to the prediction image and a frame that is two frames previous to the prediction image.

4. The image processing apparatus according to claim 3, wherein the prediction image generating circuitry adds the image obtained by the first filtering circuitry by the application of the low-pass filter and the image obtained by the second filtering circuitry by the application of the high-pass filter to said one motion compensation image of the plurality of motion compensation images, which is extracted from the frame that is one frame previous to the first prediction image.

5. The image total processing apparatus according to claim 4, wherein the motion compensation circuitry further includes:

unidirectional prediction circuitry that performs unidirectional prediction using the plurality of motion compensation images to generate the second prediction image; and
bidirectional prediction circuitry that performs bidirectional prediction using the plurality of motion compensation images to generate the third prediction image,
wherein the prediction image generating circuitry is configured to perform one of
refer to an identification flag included in one of the encoded images to select generation of the second prediction image through unidirectional prediction using the unidirectional prediction circuitry,
generate the third prediction image through bidirectional prediction using the bidirectional prediction circuitry, and
generate the first prediction image by applying the low-pass filter to the difference image between the plurality of motion compensation images, by applying the high-pass filter to the image obtained by applying the low-pass filter, and by adding the image obtained by applying the low-pass filter and the image obtained by applying the high-pass filter to said one of the plurality of motion compensation images.

6. An image processing method comprising:
performing motion compensation using, as reference frames, a plurality of frames formed of images obtained by decoding encoded images and using motion vectors included in the encoded images, and generating a plurality of motion compensation images corresponding to a prediction image from different reference frames, wherein said performing motion compensation includes:
generating the plurality of motion compensation images;
applying a low-pass filter to a difference image between the plurality of generated motion compensation images;
applying a high-pass filter to an image obtained in said applying the low-pass filter; and
generating the prediction image by adding the image obtained in said applying the low-pass filter and an image obtained in said applying the high-pass filter to one of the plurality of generated motion compensation images.

7. An image processing apparatus comprising:
detecting circuitry that detects a motion vector based on an image, which is obtained through local decoding based on a residual image indicating a difference between an original image to be subjected to encoding and a prediction image, and based on the original image, the prediction image being any one of a first prediction image, a second prediction image, and a third prediction image; and
motion compensation circuitry that performs motion compensation using, as reference frames, a plurality of frames formed of images obtained through local decoding and using the motion vector detected by the detecting circuitry, and that extracts a plurality of motion compensation images for generation of the prediction image from different reference frames, wherein the motion compensation circuitry includes:
prediction circuitry that extracts the plurality of motion compensation images;
first filtering circuitry that applies a low-pass filter to a difference image between the plurality of motion compensation images;

second filtering circuitry that applies a high-pass filter to an image obtained by the first filtering circuitry by the application of the low-pass filter; and prediction image generating circuitry that generates the first prediction image by adding the image obtained by the first filtering circuitry by the application of the low-pass filter and an image obtained by the second filtering circuitry by the application of the high-pass filter to one of the plurality of motion compensation images extracted by the prediction circuitry.

8. The image processing apparatus according to claim 7, further comprising encoding circuitry that encodes the original image using the first prediction image generated by the prediction image generating circuitry.

9. The image processing apparatus according to claim 8, wherein the motion compensation circuitry further includes:
control circuitry that sets, in an encoded image obtained by encoding the original image, a flag identifying one of
generation of the second prediction image to be added to an image to be decoded using unidirectional prediction,
generation of the third prediction image to be added to the image to be decoded, using bidirectional prediction, and
generation of the first prediction image to be added to the image to be decoded, by applying the low-pass filter to the difference image between the plurality of motion compensation images, by applying the high-pass filter to the image obtained by applying the low-pass filter, and by adding the image obtained by applying the low-pass filter and the image obtained by applying the high-pass filter to said one of the plurality of motion compensation images.

10. An image processing method comprising:
detecting a motion vector based on an image, which is obtained through local decoding based on a residual image indicating a difference between an original image to be subjected to encoding and a prediction image, and based on the original image; and
performing motion compensation using, as reference frames, a plurality of frames formed of images obtained through local decoding and using the motion vector detected in the detecting, and extracting a plurality of motion compensation images corresponding to the prediction image from different reference frames, wherein said performing motion compensation includes:
extracting the plurality of motion compensation images;
applying a low-pass filter to a difference image between the plurality of extracted motion compensation images;
applying a high-pass filter to an image obtained in said applying the low-pass filter; and
generating the prediction image by adding the image obtained in said applying the low-pass filter and an image obtained in said applying the high-pass filter to one of the plurality of extracted motion compensation images.

11. The image processing apparatus according to claim 1, wherein said one of the plurality of motion compensation images generated by the prediction circuitry that is added to the images obtained by the first and second filter circuitry is added directly to the images obtained by the first and second filter circuitry without being applied to a filter.

12. The image processing apparatus according to claim 1, wherein said prediction image generating circuitry adds the image obtained by the first filtering circuitry to the image obtained by the second filtering circuitry, prior to adding the sum thereof to said one of the plurality of motion compensation images generated by the prediction circuitry, the sum of adding the image obtained by the first filtering circuitry to the image obtained by the second filtering circuitry being a representation of a high-frequency component.

13. The image processing apparatus according to claim 1, further comprising frame memory circuitry, an output of the frame memory circuitry being selectively supplied to one of the motion compensation circuitry and intra-prediction circuitry.

14. The image processing method according to claim 6, wherein said one of the plurality of motion compensation images added to the images obtained by the low-pass and high-pass filters is added directly to the images obtained by the low-pass and high-pass filters without being filtered.

15. The image processing method according to claim 6, wherein the image obtained by the low-pass filter is added to the image obtained by the high-pass filter, prior to adding the sum thereof to said one of the plurality of motion compensation images, the sum of adding the image obtained by the low-pass filter to the image obtained by the high-pass filter being a representation of a high-frequency component of the image.

16. The image processing apparatus according to claim 7, wherein said one of the plurality of motion compensation images extracted by the prediction circuitry that is added to the images obtained by the first and second filter circuitry is added directly to the images obtained by the first and second filter circuitry without being applied to a filter.

17. The image processing apparatus according to claim 7, wherein said prediction image generating circuitry adds the image obtained by the first filtering circuitry to the image obtained by the second filtering circuitry, prior to adding the sum thereof to said one of the plurality of motion compensation images extracted by the prediction circuitry, the sum of adding the image obtained by the first filtering circuitry to the image obtained by the second filtering circuitry being a representation of a high-frequency component.

18. The image processing apparatus according to claim 7, further comprising frame memory circuitry, an output of said frame memory circuitry being selectively supplied to one of the motion compensation circuitry and intra-prediction circuitry.

19. The image processing method according to claim 10, wherein said one of the plurality of motion compensation images added to the images obtained by the low-pass and high-pass filters is added directly to the images obtained by the low-pass and high-pass filters without being filtered.

20. The image processing method according to claim 10, wherein the image obtained by the low-pass filter is added to the image obtained by the high-pass filter, prior to adding the sum thereof to said one of the plurality of motion compensation images, the sum of adding the image obtained by the low-pass filter to the image obtained by the high-pass filter being a representation of a high-frequency component of the image.

* * * * *